(12) United States Patent
Morimoto et al.

(10) Patent No.: US 12,183,516 B2
(45) Date of Patent: Dec. 31, 2024

(54) THREE-TERMINAL MULTILAYER CERAMIC CAPACITOR

(71) Applicant: Murata Manufacturing Co., Ltd., Nagaokakyo (JP)

(72) Inventors: Yuichiro Morimoto, Nagaokakyo (JP); Toshiyuki Nakamura, Nagaokakyo (JP); Noriyuki Ookawa, Nagaokakyo (JP); Daisho Tsubokawa, Nagaokakyo (JP); Masaru Takahashi, Nagaokakyo (JP); Nobuyasu Hamamori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 131 days.

(21) Appl. No.: 18/124,606

(22) Filed: Mar. 22, 2023

(65) Prior Publication Data

US 2023/0317375 A1 Oct. 5, 2023

(30) Foreign Application Priority Data

Apr. 5, 2022 (JP) .................................. 2022-062924

(51) Int. Cl.
| | |
|---|---|
| H01G 4/30 | (2006.01) |
| H01G 2/06 | (2006.01) |
| H01G 4/008 | (2006.01) |
| H01G 4/012 | (2006.01) |
| H01G 4/12 | (2006.01) |
| H01G 4/232 | (2006.01) |

(52) U.S. Cl.
CPC ........... H01G 4/2325 (2013.01); H01G 2/065 (2013.01); H01G 4/008 (2013.01); H01G 4/012 (2013.01); H01G 4/12 (2013.01); H01G 4/30 (2013.01)

(58) Field of Classification Search
CPC ...... H01G 4/2325; H01G 4/065; H01G 4/008; H01G 4/012; H01G 4/12; H01G 4/30
See application file for complete search history.

(56) References Cited

U.S. PATENT DOCUMENTS

| | | | |
|---|---|---|---|
| 2018/0082785 A1* | 3/2018 | Asano | H01G 4/232 |
| 2018/0082786 A1* | 3/2018 | Asano | H01G 4/30 |
| 2018/0082787 A1* | 3/2018 | Hamamori | H01G 4/232 |

(Continued)

FOREIGN PATENT DOCUMENTS

| | | |
|---|---|---|
| JP | 2010-109238 A | 5/2010 |
| JP | 2018-49883 A | 3/2018 |

(Continued)

*Primary Examiner* — Michael P McFadden
(74) *Attorney, Agent, or Firm* — Keating & Bennett, LLP

(57) ABSTRACT

In a three-terminal multilayer ceramic capacitor, each of first through fourth external electrodes includes a base electrode layer including a conductive metal and a glass component, an organic layer including an organosilicon compound covering the base electrode layer, and a plating layer on the organic layer. On a surface of the organic layer in a portion facing the plating layer, an atomic concentration ratio of Si to Cu is greater than or equal to about 1.5% and less than or equal to about 5.5%, or greater than or equal to about 0.8% and less than or equal to about 2.8%, and a surface roughness is greater than or equal to about 0.334 and less than or equal to about 0.371, or greater than or equal to about 0.352 and less than or equal to about 0.395.

19 Claims, 8 Drawing Sheets

(56) References Cited

U.S. PATENT DOCUMENTS

| | | | |
|---|---|---|---|
| 2018/0082788 A1* | 3/2018 | Asano | H01G 4/005 |
| 2018/0082789 A1* | 3/2018 | Asano | H01G 2/14 |
| 2021/0020367 A1 | 1/2021 | Yun et al. | |
| 2021/0183570 A1 | 6/2021 | Nakano et al. | |
| 2021/0183581 A1 | 6/2021 | Nakano et al. | |

FOREIGN PATENT DOCUMENTS

| | | |
|---|---|---|
| JP | 2018-49884 A | 3/2018 |
| JP | 2018-49885 A | 3/2018 |
| JP | 2021-19192 A | 2/2021 |
| JP | 2021-93494 A | 6/2021 |
| JP | 2021-93495 A | 6/2021 |

\* cited by examiner

THREE-TERMINAL MULTILAYER CERAMIC CAPACITOR

CROSS REFERENCE TO RELATED APPLICATIONS

This application claims the benefit of priority to Japanese Patent Application No. 2022-062924 filed on Apr. 5, 2022. The entire contents of this application are hereby incorporated herein by reference.

BACKGROUND OF THE INVENTION

1. Field of the Invention

The present invention relates to a three-terminal multilayer ceramic capacitor.

2. Description of the Related Art

Conventionally, multilayer ceramic electronic components such as capacitors, inductors, and resistors have been used in various electronic devices.

Generally, these electronic components include a multilayer body having two principal planes facing each other in a multilayer direction, two side surfaces facing each other in a width direction perpendicular or substantially perpendicular to the multilayer direction, and two end surfaces facing each other in a length direction perpendicular or substantially perpendicular to the multilayer direction and the width direction.

At least two external electrodes are provided on an outer surface of the multilayer body. The external electrode is formed on a portion of the end surface and the principal plane, a portion of the end surface and the side surface, or a portion of the end surface, the side surface, and the principal plane. A sectional shape along the multilayer direction of the external electrodes has a substantially U-shape or a substantially L-shape.

Such a multilayer ceramic electronic component is mounted on a substrate by electrically connecting a portion formed mainly on the principal plane or the side surface of each external electrode to a land of the substrate through a bonding material such as solder.

However, in this mounting structure, when the deflection is generated in the substrate due to thermal shock or the like, stress based on the deflection is transmitted to the multilayer body through the land, the bonding material, and the external electrode, and a crack, deformation, and the like are generated in a dielectric layer and an internal electrode layer of the multilayer body. As a result, there is a concern that performance degradation and reliability degradation of the multilayer ceramic electronic component may be caused.

For this reason, Japanese Patent Laying-Open No. 2010-109238 discloses a ceramic element assembly in which a pair of leading-end separating portions separated from the principal planes of the ceramic element assembly are provided in wraparound portions of the pair of external terminal electrodes, respectively, in order to prevent the ceramic element assembly from being cracked by the stress.

SUMMARY OF THE INVENTION

However, the wraparound portions of the pair of external terminal electrodes disclosed in Japanese Patent Laying-Open No. 2010-109238 each have a pair of proximal end-side joint portions joined to the principal plane of the ceramic body. Accordingly, there is a concern that the stress is transmitted to the ceramic body through the pair of proximal end-side joint portions and the pair of external terminal electrodes, and it is difficult to sufficiently prevent the generation of a crack.

Therefore, preferred embodiments of the present invention provide a three-terminal multilayer ceramic capacitor capable of preventing transmission of stress based on deflections of the multilayer body and preventing generation of cracks even when a substrate on which the capacitor is mounted is deflected by thermal shock or the like.

A three-terminal multilayer ceramic capacitor according to a preferred embodiment of the present invention includes a multilayer body, a first internal electrode layer, a second internal electrode layer, a first external electrode, a second external electrode, a third external electrode, and a fourth external electrode. The multilayer body includes a first principal plane and a second principal plane facing each other in a height direction, a first end surface and a second end surface facing each other in a length direction perpendicular or substantially perpendicular to the height direction, and a first side surface and a second side surface facing each other in a width direction perpendicular or substantially perpendicular to the height direction and the length direction, and includes a plurality of laminated dielectric layers. The first internal electrode layer is located on the plurality of dielectric layers and extracted to the first end surface and the second end surface. The second internal electrode layer is located on the plurality of dielectric layers and extracted to the first side surface and the second side surface. The first external electrode is located on the first end surface and connected to the first internal electrode layer. The second external electrode is located on the second end surface and connected to the first internal electrode layer. The third external electrode is located on the first side surface, extends from the first side surface, is located on a portion of the first principal plane and a portion of the second principal plane, and is connected to the second internal electrode layer. The fourth external electrode is located on the second side surface, extends from the second side surface, is located on a portion of the first principal plane and a portion of the second principal plane, and is connected to the second internal electrode layer. The first external electrode includes a first base electrode layer including a conductive metal and a glass component, a first organic layer including an organosilicon compound covering the first base electrode layer, and a first plating layer located on the first organic layer. The second external electrode includes a second base electrode layer including a conductive metal and a glass component, a second organic layer including an organosilicon compound covering the second base electrode layer, and a second plating layer located on the second organic layer. The third external electrode includes a third base electrode layer including a conductive metal and a glass component, a third organic layer including an organosilicon compound covering the third base electrode layer, and a third plating layer located on the third organic layer. The fourth external electrode includes a fourth base electrode layer including a conductive metal and a glass component, a fourth organic layer including an organosilicon compound covering the fourth base electrode layer, and a fourth plating layer located on the fourth organic layer. The first organic layer covers the first base electrode layer. The second organic layer covers the second base electrode layer. In a Cu concentration and a Si concentration on the surface of the first organic layer in a portion facing the first plating layer, an atomic concentration ratio of Si to Cu is greater than or equal to about 1.5% and less than or equal to about 5.5%. In the Cu concentration and the Si concentration on the surface of the second organic layer in a portion facing the second plating layer, the atomic concentration ratio of Si to Cu is greater than or equal to about 1.5% and less than or equal to about 5.5%. A surface roughness of the portion facing the first plating layer on the surface of the first organic layer is greater than or equal to about 0.334 and less than or equal to about 0.371. A surface roughness of the portion facing the second plating layer on the surface of the second organic layer is greater than or equal to about 0.334 and less than or equal to about 0.371. The third organic layer covers the third base electrode layer. The fourth organic layer covers the fourth base electrode layer. In the Cu concentration and the Si concentration on the surface of the third organic layer in the portion facing the third plating layer, the atomic concentration ratio of Si to Cu is greater than or equal to about 0.8% and less than or equal to about 2.8%. In the Cu concentration and the Si concentration on the surface of the fourth organic layer in the portion facing the fourth plating layer, the atomic concentration ratio of Si to Cu is greater than or equal to about 0.8% and less than or equal to about 2.8%. A surface roughness of the portion facing the third plating layer on the surface of the third organic layer is greater than or equal to about 0.352 and less than or equal to about 0.395. A surface roughness of the portion facing the fourth plating layer on the surface of the fourth organic layer is greater than or equal to about 0.352 and less than or equal to about 0.395.

In a three-terminal multilayer ceramic capacitor according to a preferred embodiment of the present invention, even when the substrate is deflected due to, for example, thermal shock or the like while the three-terminal multilayer ceramic capacitor is mounted on the substrate, the degree of freedom in design can be increased while the generation of cracks, the deformations, and the like in the dielectric layer or the internal electrode layer are reduced or prevented.

A specific description of unique features of an example embodiment of the present disclosure is as follows. In the Cu concentration and the Si concentration on the surface of the first organic layer, the atomic concentration ratio of Si to Cu is greater than or equal to about 1.5% and less than or equal to about 5.5%, and the surface roughness of the first organic layer is greater than or equal to about 0.334 and less than or equal to about 0.371, so that the first plating layer is easily peeled off from the first organic layer on the first base electrode layer by the stress based on the deflection generated in the substrate by the thermal shock or the like. That is, the stress is dispersed by peeling the first plating layer from the first organic layer on the first base electrode layer. Similarly, in the Cu concentration and the Si concentration on the surface of the second organic layer, the atomic concentration ratio of Si to Cu is greater than or equal to about 1.5% and less than or equal to about 5.5%, and the surface roughness of the second organic layer is greater than or equal to about 0.334 and less than or equal to about 0.371, so that the second plating layer is easily peeled off from the second organic layer on the second base electrode layer by the stress based on the deflection generated in the substrate by the thermal shock or the like. That is, the stress is dispersed by peeling the second plating layer from the second organic layer on the second base electrode layer. As described above, the generation of cracks, the deformation, and the like in the dielectric layer and the internal electrode layer can be reduced or prevented, and the metal exposure failure of the first and second base electrode layers can be reduced or prevented.

In the Cu concentration and the Si concentration on the surface of the third organic layer, the atomic concentration ratio of Si to Cu is greater than or equal to about 0.8% and less than or equal to about 2.8%, and the surface roughness of the third organic layer is greater than or equal to about 0.352 and less than or equal to about 0.395, so that the third plating layer is easily peeled off from the third organic layer on the third base electrode layer by the stress based on the deflection of the substrate caused by the thermal shock or the like. That is, the stress is dispersed by peeling the third plating layer from the third organic layer on the third base electrode layer. Similarly, in the Cu concentration and the Si concentration at the surface of the fourth organic layer, the atomic concentration ratio of Si to Cu is greater than or equal to about 0.8% or more and less than or equal to about 2.8%, and the surface roughness of the fourth organic layer is greater than or equal to about 0.352 and less than or equal to about 0.395, so that the fourth plating layer is easily peeled off from the fourth organic layer on the fourth base electrode layer by the stress based on the deflection generated in the substrate by the thermal shock or the like. That is, the stress is dispersed by peeling the fourth plating layer from the fourth organic layer on the fourth base electrode layer. As described above, the generation of cracks, the deformation, and the like in the dielectric layer or the internal electrode layer can be prevented, and a plating turning-up defect can be prevented.

As described above, because the first to fourth plating layers are easily peeled off from the first to fourth base electrode layers, the stress applied to the three-terminal multilayer ceramic capacitor is dispersed, so that the generation of cracks, the deformation, and the like in the dielectric layer or the internal electrode layer of the three-terminal multilayer ceramic capacitor can be prevented.

According to various preferred embodiments of the present invention, the generation of cracks, the deformation, and the like in the dielectric layer or the internal electrode layer of the multilayer body can be reduced or prevented, and the performance and the reliability of the three-terminal multilayer ceramic capacitor can be improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENT

1. Three-Terminal Multilayer Ceramic Capacitor

A three-terminal multilayer ceramic capacitor according to a preferred embodiment of the present invention will be described.

Figure 1:
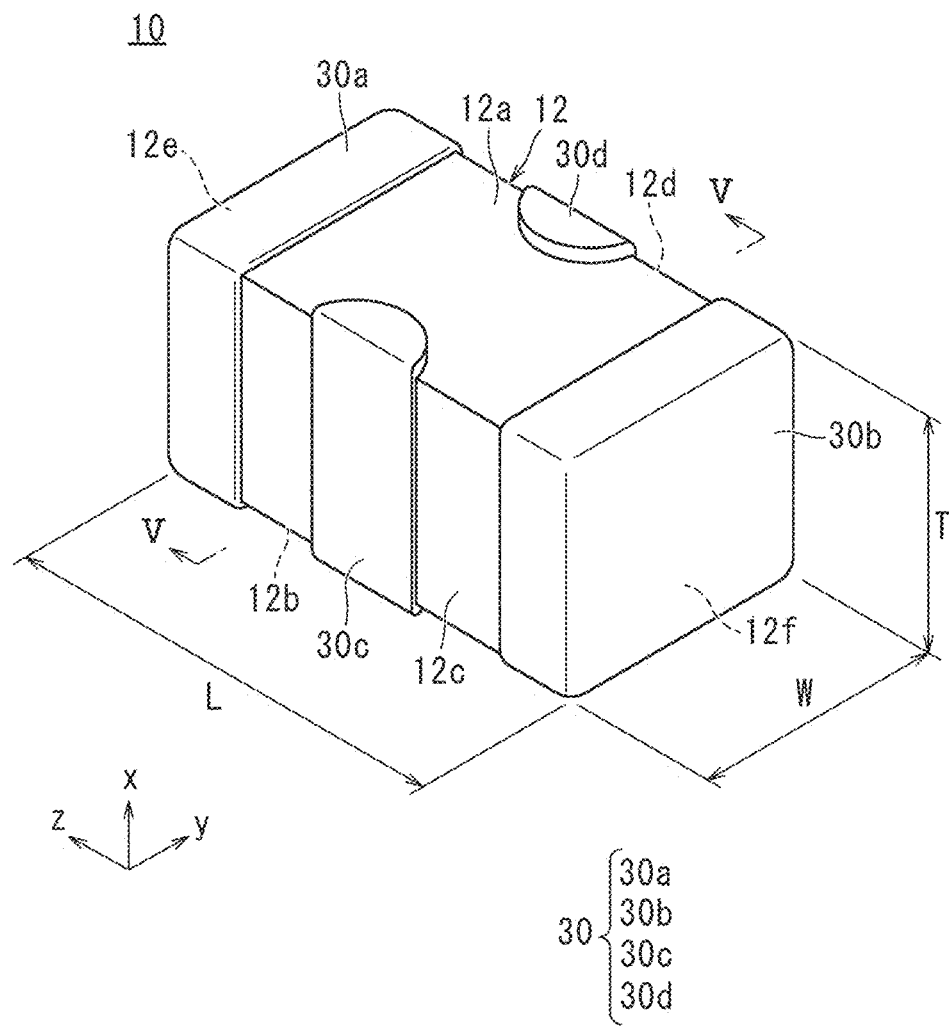
FIG. 1 is an external perspective view illustrating an example of a three-terminal multilayer ceramic capacitor according to a preferred embodiment of the present invention.
Figure 2:
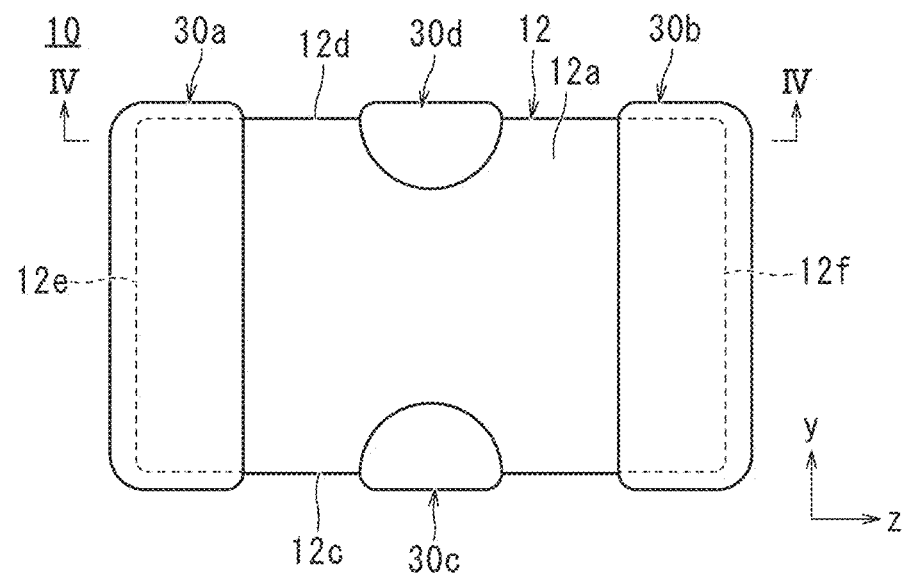
FIG. 2 is a top view illustrating an example of a three-terminal multilayer ceramic capacitor according to a preferred embodiment of the present invention.
Figure 3:
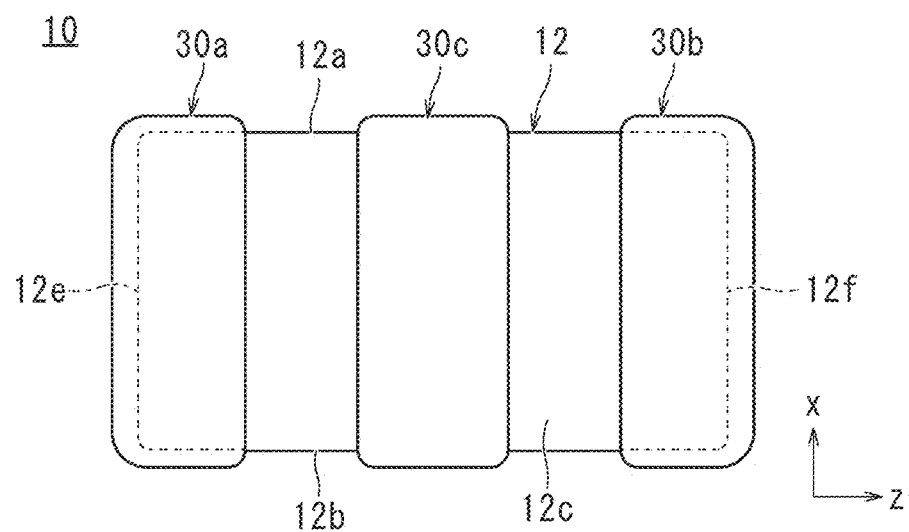
FIG. 3 is a front view illustrating an example of a three-terminal multilayer ceramic capacitor according to a preferred embodiment of the present invention.
Figure 4:
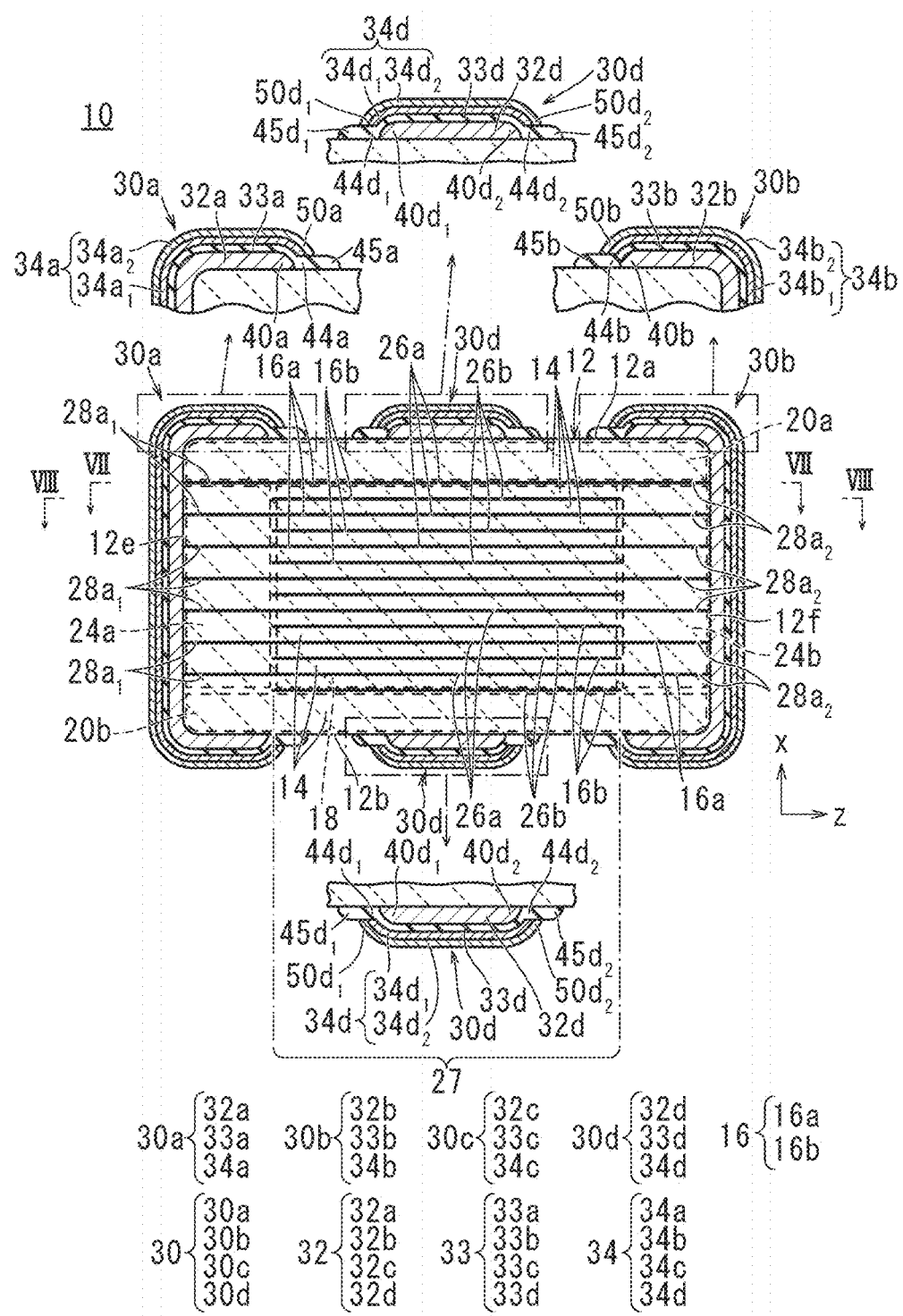
FIG. 4 is a sectional view taken along a line IVA-IVA in FIG. 2.
Figure 5:
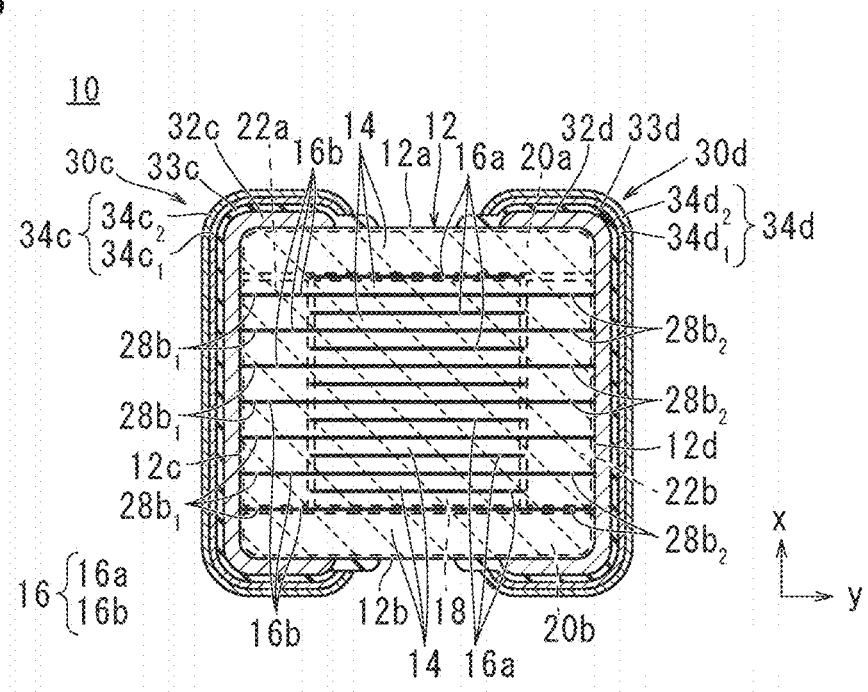
FIG. 5 is a sectional view taken along a line V-V in FIG. 1.
Figure 6:
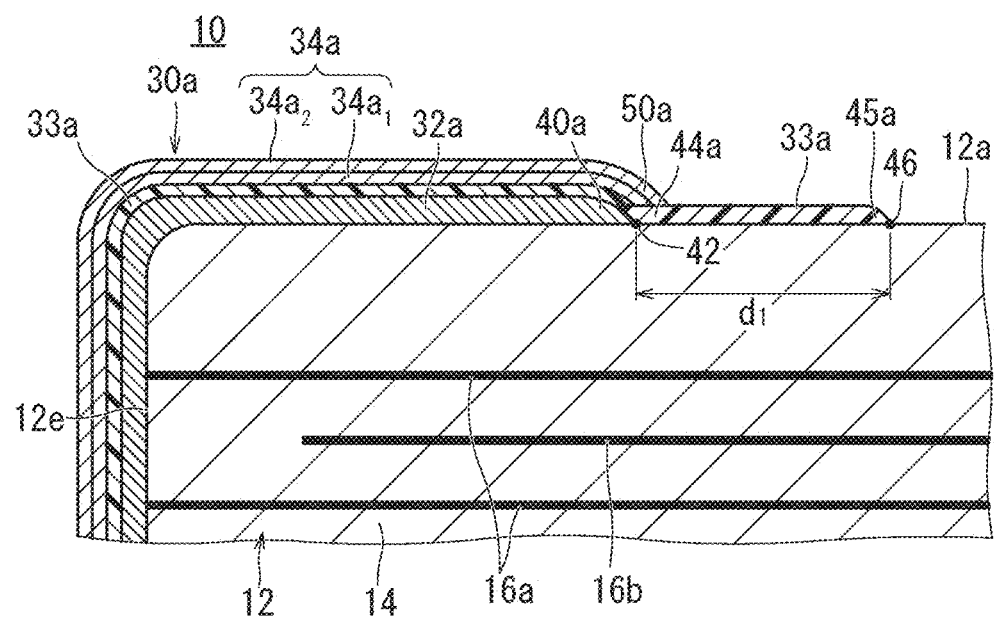
FIG. 6 is a sectional view illustrating a three-terminal multilayer ceramic electronic component according to a preferred embodiment of the present invention, and a partially enlarged view illustrating an external electrode in FIG. 4.
Figure 7:
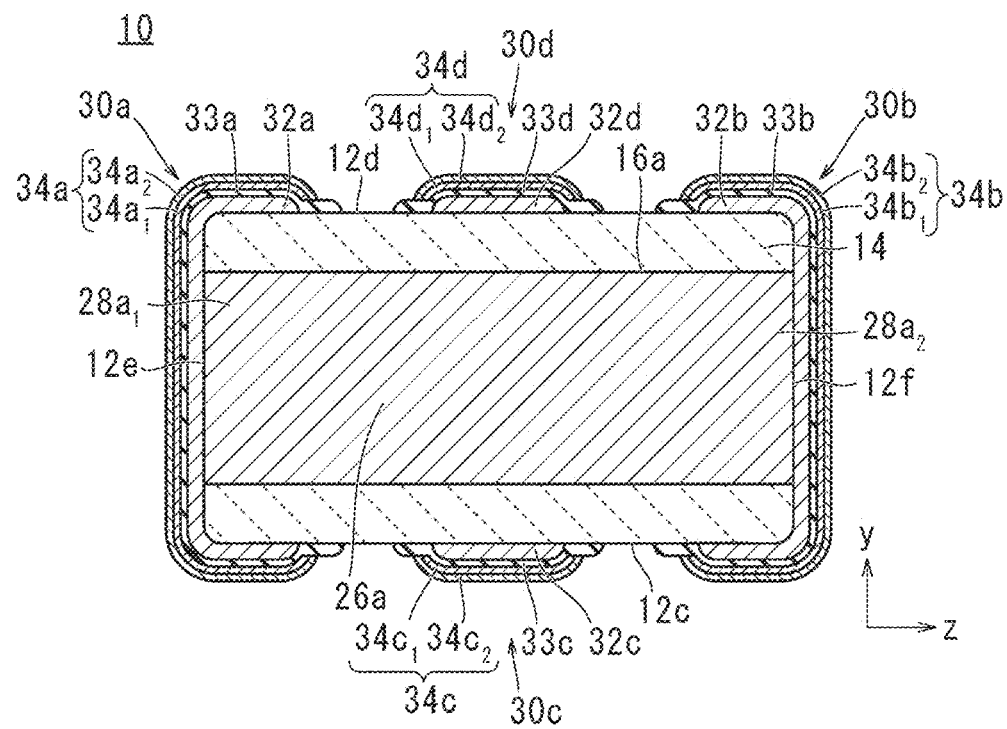
FIG. 7 is a sectional view taken along a line VII-VII in FIG. 4.
Figure 8:
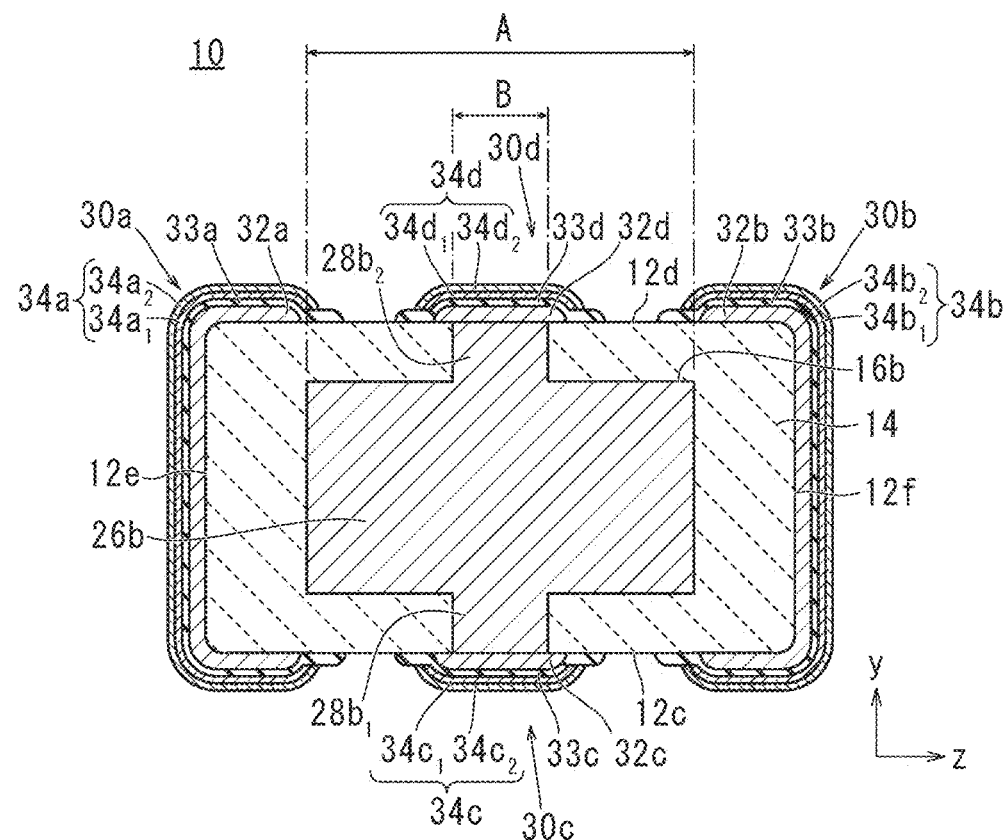
FIG. 8 is a sectional view taken along a line VIII-VIII in FIG. 4.

FIG. 1 is an external perspective view illustrating an example of the three-terminal multilayer ceramic capacitor according to the present preferred embodiment of the present invention. FIG. 2 is a top view illustrating an example of the three-terminal multilayer ceramic capacitor according to the present preferred embodiment of the present invention. FIG. 3 is a front view illustrating an example of the three-terminal multilayer ceramic capacitor according to the present preferred embodiment of the present invention. FIG. 4 is a sectional view taken along a line IV-IV in FIG. 2. FIG. 5 is a sectional view taken along a line V-V in FIG. 1. FIG. 6 is a sectional view illustrating a three-terminal multilayer ceramic electronic component according to the present preferred embodiment of the present invention, and a partially enlarged view illustrating an external electrode in FIG. 4. FIG. 7 is a sectional view taken along a line VII-VII in FIG. 4. FIG. 8 is a sectional view taken along a line VIII-VIII in FIG. 4.

As illustrated in FIG. 1, for example, a three-terminal multilayer ceramic capacitor 10 includes a rectangular or substantially rectangular parallelepiped multilayer body 12 and an external electrode 30.

Multilayer body 12 includes a plurality of laminated dielectric layers 14 and a plurality of internal electrode layers 16 laminated on dielectric layers 14. Dielectric layer 14 and internal electrode layer 16 are laminated in a height direction x.

Furthermore, multilayer body 12 includes a first principal plane 12a and a second principal plane 12b that face each other in height direction x, a first side surface 12c and a second side surface 12d that face each other in a width direction y perpendicular or substantially perpendicular to height direction x, and a first end surface 12e and a second end surface 12f that face each other in a length direction z perpendicular or substantially perpendicular to height direction x and width direction y. In multilayer body 12, a corner and a ridge are rounded. The corner is a portion where three adjacent surfaces of the multilayer body intersect with one another, and the ridge is a portion where two adjacent surfaces of the multilayer body intersect with each other. Irregularities or the like may be formed on a part or all of first principal plane 12a and second principal plane 12b, first side surface 12c and second side surface 12d, and first end surface 12e and second end surface 12f.

A dimension L in length direction z of multilayer body 12 is not necessarily longer than a dimension W in width direction y.

Multilayer body 12 includes an inner layer portion 18, and a first principal plane-side outer layer portion 20a and a second principal plane-side outer layer portion 20b that are disposed so as to sandwich inner layer portion 18 therebetween in a multilayer direction.

Inner layer portion 18 includes the plurality of dielectric layers 14 and the plurality of internal electrode layers 16. Inner layer portion 18 includes internal electrode layer 16 located closest to the side of first principal plane 12a to internal electrode layer 16 located closest to the side of second principal plane 12b in the multilayer direction. Internal electrode layer 16 includes a first internal electrode layer 16a extended to first end surface 12e and second end surface 12f, and a second internal electrode layer 16b extended to first side surface 12c and second side surface 12d. In inner layer portion 18, a plurality of first internal electrode layers 16a and a plurality of second internal electrode layers 16b are opposed to each other with dielectric layer 14 interposed therebetween. Inner layer portion 18 is a portion that generates electrostatic capacitance to substantially function as a capacitor.

First principal plane-side outer layer portion 20a is located on the side of first principal plane 12a, and including a plurality of dielectric layers 14 located between first principal plane 12a and the outermost surface of inner layer portion 18 on the side of first principal plane 12a. First principal plane-side outer layer portion 20a is an aggregate of the plurality of dielectric layers 14 located between first principal plane 12a and internal electrode layer 16 closest to first principal plane 12a. Dielectric layer 14 used in first principal plane-side outer layer portion 20a may be the same as dielectric layer 14 used in inner layer portion 18 or be different from dielectric layer 14.

Similarly, second principal plane-side outer layer portion 20b is located on the side of second principal plane 12b, and including the plurality of dielectric layers 14 located between second principal plane 12b and the outermost surface of inner layer portion 18 on the side of second principal plane 12b. That is, second principal plane-side outer layer portion 20b is an aggregate of the plurality of dielectric layers 14 located between second principal plane 12b and internal electrode layer 16 closest to second principal plane 12b. Dielectric layer 14 used in second principal plane-side outer layer portion 20b may be the same as dielectric layer 14 used in inner layer portion 18 or be different from dielectric layer 14.

Multilayer body 12 includes a first side surface-side outer layer portion 22a that is located on the side of first side surface 12c and including the plurality of dielectric layers 14 located between first side surface 12c and the outermost surface of inner layer portion 18 on the side of first side surface 12c.

Similarly, multilayer body 12 includes a second side surface-side outer layer portion 22b that is located on the side of second side surface 12d and including the plurality of dielectric layers 14 located between second side surface 12d and the outermost surface of inner layer portion 18 on the side of second side surface 12d.

First side surface-side outer layer portion 22a and second side surface-side outer layer portion 22b are also referred to as a W gap or a side gap.

Multilayer body 12 includes a first end surface-side outer layer portion 24a that is located on the side of first end surface 12e and including the plurality of dielectric layers 14 located between first end surface 12e and the outermost surface of inner layer portion 18 on the side of first end surface 12e.

Similarly, multilayer body 12 includes a second end surface-side outer layer 24b that is located on the side of second end surface 12f and including the plurality of dielectric layers 14 located between second end surface 12f and the outermost surface of inner layer portion 18 on the side of second end surface 12f.

First end surface-side outer layer portion 24a and second end surface-side outer layer portion 24b are also referred to as an L gap or an end gap.

For example, dielectric layer 14 can be made of a dielectric material as a ceramic material. For example, a dielectric ceramic including a component such as $BaTiO_3$, $CaTiO_3$, $SrTiO_3$, or $CaZrO_3$ can be used as such the dielectric material. When the dielectric material is included as a main component, for example, a material to which an accessory component having a content smaller than that of the main component such as an Mn compound, an Fe compound, a Cr compound, a Co compound, or an Ni compound is added may be used depending on the desired characteristic of multilayer body 12.

Preferably, the thickness of dielectric layer 14 after baking is greater than or equal to about 0.5 μm and less than or equal to about 10.0 μm. The number of dielectric layers 14 to be laminated is preferably greater than or equal to about 15 and less than or equal to about 500. The number of dielectric layers 14 is the total number of the number of dielectric layers 14 of inner layer portion 18 and the number of dielectric layers 14 of first principal plane-side outer layer portion 20a and second principal plane-side outer layer portion 20b.

Multilayer body 12 includes the plurality of first internal electrode layers 16a and the plurality of second internal electrode layers 16b as the plurality of internal electrode layers 16.

The plurality of first internal electrode layers 16a and the plurality of second internal electrode layers 16b may be alternately laminated with dielectric layers 14 interposed therebetween, or a plurality of dielectric layers 14 on which first internal electrode layers 16a are disposed may be laminated, and then dielectric layers 14 on which second internal electrode layers 16b are disposed may be laminated. In this manner, the multilayer pattern can be changed according to the capacitance value to be implemented.

As illustrated in FIG. 7, first internal electrode layer 16a includes a first opposing portion 26a opposite to second internal electrode layer 16b, a first extracting electrode portion $28a_1$ extracted from first opposing portion 26a to the surface of first end surface 12e of multilayer body 12, and a second extracting electrode portion $28a_2$ extracted from first opposing portion 26a to the surface of second end surface 12f of multilayer body 12. Specifically, first extracting electrode portion $28a_1$ is exposed onto the surface of first end surface 12e of multilayer body 12, and second extracting electrode portion $28a_2$ is exposed onto the surface of second end surface 12f of multilayer body 12. Accordingly, first internal electrode layer 16a is not exposed to first side surface 12c and second side surface 12d of multilayer body 12.

The shape of first opposing portion 26a and the shapes of first extracting electrode portion $28a_1$ and second extracting electrode portion $28a_2$ are not particularly limited, but are preferably rectangular or substantially rectangular, and a corner may be rounded.

The lengths in the width direction y of first extracting electrode portion $28a_1$ and second extracting electrode portion $28a_2$ may be the same as or shorter than the length in the width direction y of first opposing portion 26a.

The shapes of first extracting electrode portion $28a_1$ and second extracting electrode portion $28a_2$ may be tapered.

As illustrated in FIG. 8, second internal electrode layer 16b has a substantially cross shape, and includes a second opposing portion 26b opposite to first internal electrode layer 16a, a third extracting electrode portion 28b1 extracted from second opposing portion 26b to the surface of first side surface 12c of multilayer body 12, and a fourth extracting electrode portion 28b2 extracted from second opposing portion 26b to the surface of second side surface 12d of multilayer body 12. Specifically, third extracting electrode portion 28b1 is exposed onto the surface of first side surface 12c of multilayer body 12, and fourth extracting electrode portion 28b2 is exposed onto the surface of second side surface 12d of multilayer body 12. Accordingly, second internal electrode layer 16b is not exposed onto the surface of first end surface 12e and the surface of second end surface 12f of multilayer body 12.

The shape of second opposing portion 26b and the shapes of third extracting electrode portion 28b1 and fourth extracting electrode portion 28b2 are preferably rectangular or substantially rectangular, and a corner may be rounded.

As illustrated in FIG. 8, the relationship between dimension A in length direction z of second opposing portion 26b connecting a side on the side of first end surface 12e and a side on the side of second end surface 12f and dimension B in length direction z of third extracting electrode portion 28b1 and fourth extracting electrode portion 28b2 connecting a side on the side of first end surface 12e and a side on the side of second end surface 12f is preferably A≥B.

The shape of third extracting electrode portion 28b1 may be a tapered shape in which the width decreases toward first side surface 12c, and the shape of fourth extracting electrode portion 28b2 may be a tapered shape in which the width decreases toward second side surface 12d.

Multilayer body 12 has an opposing electrode portion 27. Opposing electrode portion 27 is a portion in which first opposing portion 26a of first internal electrode layer 16a and second opposing portion 26b of second internal electrode layer 16b are opposed to each other. Opposing electrode portion 27 is configured as a portion of inner layer portion 18. Opposing electrode portion 27 is also referred to as a capacitor effective portion.

First internal electrode layer 16a and second internal electrode layer 16b can be made of an appropriate conductive material such as a metal such as Ni, Cu, Ag, Pd, or Au, or an alloy, such as an Ag—Pd alloy, including at least one of these metals.

The numbers of first internal electrode layers 16a and second internal electrode layers 16b are preferably greater than or equal to about 15 and less than or equal to about 500 in total.

The thickness of first internal electrode layer 16a is not particularly limited, but for example, preferably is greater than or equal to about 0.5 μm and less than or equal to about 1.0 μm.

The thickness of second internal electrode layer 16b is not particularly limited, but for example, preferably is greater than or equal to about 0.5 μm and less than or equal to about 1.0 μm.

External electrode 30 is disposed on the side of first end surface 12e and the side of second end surface 12f, and the side of first side surface 12c and the side of second side surface 12d of multilayer body 12. External electrode 30 includes a first external electrode 30a, a second external electrode 30b, a third external electrode 30c, and a fourth external electrode 30d.

First external electrode 30a is disposed on first end surface 12e of multilayer body 12. First external electrode 30a is disposed so as to extend from first end surface 12e of multilayer body 12 and cover a portion of each of first principal plane 12a, second principal plane 12b, first side surface 12c, and second side surface 12d. In addition, first external electrode 30a is electrically connected to first extracting electrode portion $28a_1$ of first internal electrode layer 16a exposed to first end surface 12e of multilayer body 12. First external electrode 30a may be disposed only on first end surface 12e of multilayer body 12.

Second external electrode 30b is disposed on second end surface 12f of multilayer body 12. Second external electrode 30b is disposed so as to extend from second end surface 12f of multilayer body 12 and cover a portion of each of first principal plane 12a, second principal plane 12b, first side surface 12c, and second side surface 12d. Second external electrode 30b is electrically connected to second extracting electrode portion 28a2 of first internal electrode layer 16a exposed at second end surface 12f of multilayer body 12. Second external electrode 30b may be disposed only on second end surface 12f of multilayer body 12.

Third external electrode 30c is disposed on first side surface 12c of multilayer body 12. Third external electrode 30c is disposed so as to extend from first side surface 12c and cover a portion of first principal plane 12a and second principal plane 12b. Third external electrode 30c is electrically connected to third extracting electrode portion 28b1 of second internal electrode layer 16b exposed on first side surface 12c of multilayer body 12.

Fourth external electrode 30d is disposed on second side surface 12d of multilayer body 12. Fourth external electrode 30d is disposed so as to extend from second side surface 12d and cover a portion of first principal plane 12a and second principal plane 12b. Fourth external electrode 30d is electrically connected to fourth extracting electrode portion 28b2 of second internal electrode layer 16b exposed on second side surface 12d of multilayer body 12.

External electrode 30 includes a base electrode layer 32 disposed on the surface of multilayer body 12, an organic layer 33 disposed so as to cover base electrode layer 32, a plating layer 34 disposed on organic layer 33.

Base electrode layer 32 includes a first base electrode layer 32a, a second base electrode layer 32b, a third base electrode layer 32c, and a fourth base electrode layer 32d. Organic layer 33 includes a first organic layer 33a, a second organic layer 33b, a third organic layer 33c, and a fourth organic layer 33d. Plating layer 34 includes a first plating layer 34a, a second plating layer 34b, a third plating layer 34c, and a fourth plating layer 34d.

Specifically, first external electrode 30a includes a first base electrode layer 32a, a first organic layer 33a disposed so as to cover first base electrode layer 32a, and a first plating layer 34a disposed on first organic layer 33a. Second external electrode 30b includes a second base electrode layer 32b, a second organic layer 33b disposed so as to cover second base electrode layer 32b, and a second plating layer 34b disposed on second organic layer 33b. Third external electrode 30c includes a third base electrode layer 32c, a third organic layer 33c disposed so as to cover third base electrode layer 32c, and a third plating layer 34c disposed on third organic layer 33c. Fourth external electrode 30d includes a fourth base electrode layer 32d, a fourth organic layer 33d disposed so as to cover fourth base electrode layer 32d, and a fourth plating layer 34d disposed on fourth organic layer 33d.

First base electrode layer 32a is disposed on the surface of first end surface 12e of multilayer body 12, and formed so as to extend from first end surface 12e and cover a portion of first principal plane 12a, a portion of second principal plane 12b, a portion of first side surface 12c, and a portion of second side surface 12d. In this case, first base electrode layer 32a is electrically connected to first extracting electrode portion $28a_1$ of first internal electrode layer 16a.

Second base electrode layer 32b is disposed on the surface of the second end surface 12f of multilayer body 12, and formed so as to extend from second end surface 12f and cover a portion of first principal plane 12a, a portion of second principal plane 12b, a portion of first side surface 12c, and a portion of second side surface 12d. In this case, second base electrode layer 32b is electrically connected to second extracting electrode portion $28a_2$ of first internal electrode layer 16a.

First base electrode layer 32a may be disposed only on the surface of first end surface 12e of multilayer body 12, and second base electrode layer 32b may be disposed only on the surface of second end surface 12f of multilayer body 12.

Third base electrode layer 32c is disposed on the surface of first side surface 12c of multilayer body 12, and formed so as to extend from first side surface 12c and cover a portion of each of first principal plane 12a and second principal plane 12b. In this case, third base electrode layer 32c is electrically connected to third extracting electrode portion $28b_1$ of second internal electrode layer 16b.

Fourth base electrode layer 32d is disposed on the surface of second side surface 12d of multilayer body 12, and formed so as to extend from second side surface 12d and cover a portion of each of first principal plane 12a and second principal plane 12b. In this case, fourth base electrode layer 32d is electrically connected to fourth extracting electrode portion 28b2 of second internal electrode layer 16b.

As described above, a low equivalent series inductance (ESL) can be generated by providing first to fourth extracting electrode portions $28a_1$, $28a_2$, $28b_1$, $28b_2$.

Base electrode layer 32 includes at least one selected from a baked layer, a conductive resin layer, a thin film layer, and the like.

Each configuration in the case where base electrode layer 32 is the baked layer, the conductive resin layer, or the thin film layer will be described below.

Case where Base Electrode Layer is Baked Layer

The baked layer includes a glass component and a metal component. The glass component of the baked layer includes at least one selected from B, Si, Ba, Mg, Al, Li, and the like. For example, the metal component of the baked layer includes at least one selected from Cu, Ni, Ag, Pd, an Ag—Pd alloy, Au, and the like. The baked layer may include a plurality of layers. The baked layer is obtained by applying a conductive paste including the glass component and the metal component to multilayer body 12. The baked layer may be formed by simultaneously baking a multilayer chip including internal electrode layers 16 and dielectric layers 14 and a conductive paste applied to the multilayer chip, or formed by baking the multilayer chip including internal electrode layers 16 and dielectric layers 14 to obtain multilayer body 12 and then applying a conductive paste to multilayer body 12 and baking the conductive paste. When the multilayer chip including internal electrode layer 16 and dielectric layer 14 as the baked layer and the conductive paste applied to the multilayer chip are simultaneously baked, preferably the baked layer to which a dielectric material is added instead of a glass component is baked to form the baked layer.

The thickness of first base electrode layer 32a in the direction connecting first end surface 12e and second end surface 12f at the central portion in height direction x of first base electrode layer 32a located at first end surface 12e is preferably greater than or equal to about 3 µm and less than or equal to about 70 µm.

In addition, the thickness of second base electrode layer 32b in the direction connecting first end surface 12e and second end surface 12f at the central portion in height direction x of second base electrode layer 32b located on second end surface 12f is preferably greater than or equal to about 3 µm and less than or equal to about 70 µm.

When first base electrode layer 32a is provided on a portion of first principal plane 12a, a portion of second principal plane 12b, a portion of first side surface 12c, and a portion of second side surface 12d, the thickness of first base electrode layer 32a in the direction connecting first principal plane 12a and second principal plane 12b at the central portion in length direction z of first base electrode layer 32a located on first principal plane 12a and second principal plane 12b is preferably, for example, greater than or equal to about 3 µm and less than or equal to about 40 µm.

When second base electrode layer 32b is provided on a portion of first principal plane 12a, a portion of second principal plane 12b, a portion of first side surface 12c, and a portion of second side surface 12d, the thickness of second base electrode layer 32b in the direction connecting first principal plane 12a and second principal plane 12b at the central portion in length direction z of second base electrode layer 32b located on first principal plane 12a and second principal plane 12b is preferably, for example, greater than or equal to about 3 µm and less than or equal to about 40 µm.

The thickness of third base electrode layer 32c in the direction connecting first side surface 12c and second side surface 12d at the central portion in height direction x of third base electrode layer 32c located on first side surface 12c is preferably greater than or equal to about 3 µm and less than or equal to about 70 µm.

In addition, the thickness of fourth base electrode layer 32d in the direction connecting first side surface 12c and second side surface 12d at the central portion in height direction x of fourth base electrode layer 32d located on second side surface 12d is preferably greater than or equal to about 3 µm and less than or equal to about 70 µm.

Case where Base Electrode Layer is Conductive Resin Layer

The conductive resin layer may include a plurality of layers.

The conductive resin layer may be disposed on the baked layer so as to cover the baked layer, or directly disposed on multilayer body 12.

The conductive resin layer includes a thermosetting resin and metal.

The conductive resin layer may completely cover base electrode layer 32, or cover a portion of base electrode layer 32.

Because the conductive resin layer includes a thermosetting resin, the conductive resin layer is more flexible than a conductive layer formed of, for example, the plating film or the baked product of the conductive paste. For this reason, even when impact caused by physical impact or a thermal cycle is applied to three-terminal multilayer ceramic capacitor 10, the conductive resin layer can function as a buffer layer to prevent the generation of cracks in three-terminal multilayer ceramic capacitor 10.

Ag, Cu, Ni, Sn, Bi, or an alloy including them can be used as the metal included in the conductive resin layer.

In addition, metal powder in which the surface of the metal powder is coated with Ag can also be used. When an Ag-coated metal powder is used, Cu, Ni, Sn, Bi, or an alloy powder thereof is preferably used as the metal powder. The reason for using the conductive metal powder of Ag as the conductive metal is that Ag has the lowest specific resistance among metals and thus is suitable as an electrode material, and that Ag is not oxidized and has high weather resistance because Ag is a noble metal. In addition, this is because the metal of the base material can be made inexpensive while the characteristic of Ag is maintained.

Furthermore, the metal obtained by subjecting Cu, Ni to oxidation preventing treatment can also be used as the metal included in the conductive resin layer.

The metal powder obtained by coating the surface of the metal powder with Sn, Ni, Cu can also be used as the metal included in the conductive resin layer. When the metal powder coated with Sn, Ni, Cu is used, Ag, Cu, Ni, Sn, Bi, or an alloy powder thereof is preferably used as the metal powder.

When the metal powders as described above are used as the metal included in the conductive resin layer, the conductive fillers made of these metal powders come into contact with each other to form a conduction path inside the conductive resin layer.

As the metal included in the conductive resin layer, a spherical metal powder or a flat metal powder can be used, but a mixture of the spherical metal powder and the flat metal powder is preferably used.

For example, known various thermosetting resins such as an epoxy resin, a phenol resin, a urethane resin, a silicone resin, and a polyimide resin can be used as the resin for the conductive resin layer. Among others, the epoxy resin having excellent heat resistance, moisture resistance, adhesion, and the like is one of the most suitable resins.

The conductive resin layer preferably includes a curing agent together with the thermosetting resin. When the epoxy resin is used as the base resin, various known compounds such as phenol-based, amine-based, acid anhydride-based, imidazole-based, active ester-based, and amide-imide-based compounds can be used as the curing agent of the epoxy resin.

The thickness of the conductive resin layer located at the central portion in height direction x of multilayer body 12 located at first end surface 12e and second end surface 12f is preferably, for example, greater than or equal to about 10 µm and less than or equal to about 150 µm.

Case where Base Electrode Layer is Thin Film Layer

When the thin film layer is provided as base electrode layer 32, the thin film layer is formed by a thin film forming method such as a sputtering method or a vapor deposition method, and is a layer having the thickness of less than or equal to about 1 µm on which metal particles are deposited.

Organic layer 33 is disposed on base electrode layer 32, and plating layer 34 is disposed on organic layer 33. Specifically, organic layer 33 includes first organic layer 33a covering first base electrode layer 32a, second organic layer 33b covering second base electrode layer 32b, third organic layer 33c covering third base electrode layer 32c, and fourth organic layer 33d covering fourth base electrode layer 32d. Plating layer 34 includes first plating layer 34a, second plating layer 34b, third plating layer 34c, and fourth plating layer 34d. First to fourth plating layers 34a to 34d are disposed on first to fourth organic layers 33a to 33d, respectively. Hereinafter, first, plating layer 34 will be described, and then, organic layer 33 will be described.

First plating layer 34a is formed so as to cover first organic layer 33a disposed on first base electrode layer 32a. Specifically, preferably first plating layer 34a is disposed on first organic layer 33a disposed on first end surface 12e of multilayer body 12, extended therefrom, and also disposed so as to reach first organic layer 33a disposed on a portion of first principal plane 12a, a portion of second principal plane 12b, a portion of first side surface 12c, and a portion of second side surface 12d of multilayer body 12.

Second plating layer 34b is formed so as to cover second organic layer 33b disposed on second base electrode layer 32b. Specifically, preferably second plating layer 34b is disposed on second organic layer 33b disposed on second end surface 12f of multilayer body 12, extended therefrom, and also disposed so as to reach second organic layer 33b disposed on a portion of first principal plane 12a, a portion of second principal plane 12b, a portion of first side surface 12c, and a portion of second side surface 12d of multilayer body 12.

Third plating layer 34c is formed so as to cover third organic layer 33c disposed on third base electrode layer 32c. Specifically, preferably third plating layer 34c is disposed on third organic layer 33c disposed on first side surface 12c of multilayer body 12, extended therefrom, and also disposed on third organic layer 33c disposed on a portion of first principal plane 12a and a portion of second principal plane 12b of multilayer body 12.

Fourth plating layer 34d is formed so as to cover fourth organic layer 33d disposed on fourth base electrode layer 32d. Specifically, preferably fourth plating layer 34d is disposed on fourth organic layer 33d disposed on second side surface 12d of multilayer body 12, extended therefrom, and also disposed on fourth organic layer 33d disposed on a portion of first principal plane 12a and a portion of second principal plane 12b of multilayer body 12.

For example, plating layer 34 includes at least one metal selected from Cu, Ni, Sn, Ag, Pd, an Ag—Pd alloy, Au, and the like, or an alloy including the metal.

Plating layer 34 may be formed of a plurality of layers. In this case, plating layer 34 preferably has a two-layer structure of a lower plating layer (first to fourth lower plating layers $34a_1$ to $34d1$) formed by Ni plating on base electrode layer 32 and an upper plating layer (first to fourth upper plating layers $34a2$ to $34d2$) formed by Sn plating on the lower plating layer.

That is, first plating layer 34a includes first lower plating layer $34a_1$ and a first upper plating layer $34a_2$ located on the surface of first lower plating layer $34a_1$.

Second plating layer 34b includes second lower plating layer $34b_1$ and second upper plating layer $34b_2$ located on the surface of second lower plating layer $34b_1$.

Third plating layer 34c includes third lower plating layer $34c_1$ and third upper plating layer $34c_2$ located on the surface of third lower plating layer $34c_1$.

Fourth plating layer 34d includes fourth lower plating layer $34d1$ and fourth upper plating layer $34d2$ located on the surface of fourth lower plating layer $34d1$.

The lower plating layer ($34a_1$ to $34d1$) by the Ni plating is used to prevent base electrode layer 32 from being eroded by the solder in mounting three-terminal multilayer ceramic capacitor 10, and the upper plating layer ($34a_2$ to $34d2$) by the Sn plating is used such that wettability of the solder can be improved to easily mount three-terminal multilayer ceramic capacitor 10.

The thickness per plating layer is preferably greater than or equal to about 2.0 μm and less than or equal to about 15.0 μm.

In the present preferred embodiment, external electrode 30 is formed by base electrode layer 32, organic layer 33, and plating layer 34, but external electrode 30 may be formed only by plating layer 34 without providing base electrode layer 32.

Although not illustrated, a structure in which plating layer 34 is provided without providing base electrode layer 32 will be described below.

Base electrode layer 32 is not provided in any or each of first to fourth external electrodes 30a to 30d, but plating layer 34 (first to fourth plating layers 34a to 34d) may be formed directly on the surface of organic layer 33 (first to fourth organic layers 33a to 33d) of multilayer body 12. That is, three-terminal multilayer ceramic capacitor 10 may have a structure including plating layer 34 directly and electrically connected to first internal electrode layer 16a and second internal electrode layer 16b. In such a case, plating layer 34 may be formed after a catalyst is disposed on the surface of organic layer 33 of multilayer body 12 as pre-treatment.

When plating layer 34 is directly formed on organic layer 33 of multilayer body 12 without providing base electrode layer 32, base electrode layer 32 can be reduced in height, namely, reduced in thickness, or converted into the thickness of multilayer body 12, namely, the thickness of inner layer portion 18, so that the degree of freedom in designing the thin chip can be improved.

Plating layer 34 preferably includes a lower plating electrode formed on the surface of organic layer 33 of multilayer body 12 and an upper plating electrode formed on the surface of the lower plating electrode. For example, each of the lower plating electrode and the upper plating electrode preferably includes at least one metal selected from Cu, Ni, Sn, Pb, Au, Ag, Pd, Bi, Zn, or the like, or an alloy including the metal.

Furthermore, the lower plating electrode is preferably formed using Ni having solder barrier performance, and the upper plating electrode is preferably formed using Sn or Au having good solder wettability.

For example, when first internal electrode layer 16a and second internal electrode layer 16b are formed using Ni, the lower plating electrode is preferably formed using Cu having good bondability with Ni. The upper plating electrode may be formed as necessary, and each of first to fourth external electrodes 30a to 30d may be configured of only organic layer 33 and the lower plating electrode. As plating layer 34, the upper plating electrode may be used as the outermost layer, or another plating electrode may be further formed on the surface of the upper plating electrode.

At this point, when external electrode 30 is formed only with organic layer 33 and plating layer 34 without providing base electrode layer 32, the thickness per layer of plating layer 34 disposed without providing base electrode layer 32 is preferably greater than or equal to about 1 μm and less than or equal to about 15 μm.

Furthermore, plating layer 34 preferably does not include glass. The metal ratio per unit volume of plating layer 34 is preferably greater than or equal to about 99 vol %.

Organic layer 33 (first to fourth organic layers 33a to 33d) will be described below. In the present preferred embodiment, first organic layer 33a covers first base electrode layer 32a, extended therefrom, and disposed so as to cover the surface of multilayer body 12. That is, first organic layer 33a includes a portion covering first base electrode layer 32a and a portion (hereinafter, a portion in contact with multilayer body 12) that is in contact with multilayer body 12 in a portion adjacent to first base electrode layer 32a on the side of second end surface 12f and covers the surface thereof. First organic layer 33a covers an end 40a of first base electrode layer 32a closer to second end surface 12f. The portion of first organic layer 33a in contact with multilayer body 12 is disposed on first principal plane 12a, second principal plane 12b, first side surface 12c, and second side surface 12d so as to extend around the surface of multilayer body 12. One end 44a of the portion of first organic layer 33a in contact with multilayer body 12 is in contact so as to cover end 40a of first base electrode layer 32a. The portion of first organic layer 33a in contact with multilayer body 12 is disposed so as to extend from end 40a of first base electrode layer 32a to at least a portion of the surface of multilayer body 12, and the other end 45a is located closer onto the side of second end surface 12f than an end 50a of first plating layer 34a and exposed. Furthermore, end 50a of first plating layer 34a of first external electrode 30a is preferably in contact with the surface of one end 44a of the portion of first organic layer 33a that is in contact with multilayer body 12.

Second organic layer 33b covers second base electrode layer 32b, extended therefrom, and disposed so as to cover the surface of multilayer body 12. That is, second organic layer 33b has a portion covering second base electrode layer 32b and a portion (hereinafter, a portion in contact with multilayer body 12) that is in contact with multilayer body 12 in a portion adjacent to second base electrode layer 32b on the side of first end surface 12e and covers the surface thereof. Second organic layer 33b covers an end 40b of second base electrode layer 32b closer to first end surface 12e. The portion of second organic layer 33b in contact with multilayer body 12 is disposed on first principal plane 12a, second principal plane 12b, first side surface 12c, and second side surface 12d so as to extend around the surface of multilayer body 12. One end 44b of the portion of second organic layer 33b in contact with multilayer body 12 is in contact so as to cover end 40b of second base electrode layer 32b. In second organic layer 33b, a portion in contact with multilayer body 12 is disposed so as to extend from end 40b of second base electrode layer 32b to the surface of at least a portion of multilayer body 12, and the other end 45b is located closer to first end surface 12e than end 50b of second plating layer 34b and exposed. Furthermore, end 50b of second plating layer 34b of second external electrode 30b is preferably in contact with the surface of one end 44b of the portion of second organic layer 33b that is in contact with multilayer body 12.

Third organic layer 33c covers third base electrode layer 32c, extended therefrom, and disposed so as to cover the surface of multilayer body 12. That is, third organic layer 33c includes a portion covering third base electrode layer 32c and a portion (hereinafter, a portion in contact with multilayer body 12) that is in contact with multilayer body 12 in a portion adjacent to both sides of first end surface 12e and second end surface 12f with respect to third base electrode layer 32c and covers the surface thereof. Third organic layer 33c covers first end surface 12e of third base electrode layer 32c and ends 40c1, 40c2 closer to second end surface 12f. The portion of third organic layer 33c in contact with multilayer body 12 is disposed on first principal plane 12a, second principal plane 12b, and first side surface 12c in the surface of multilayer body 12. One end portions 44c1, 44c2 of the portion of third organic layer 33c in contact with multilayer body 12 are in contact with each other so as to cover end 40c1, 40c2 of third base electrode layer 32c. In third organic layer 33c, a portion in contact with multilayer body 12 is disposed so as to extend from each of ends 40c1, 40c2 of third base electrode layer 32c to at least a portion of the surface of multilayer body 12, and each of the other ends 45c1, 45c2 is located and exposed closer to first end surface 12e and second end surface 12f than each of ends 50c1, 50c2 of third plating layer 34c. Furthermore, each of ends 50c1, 50c2 of third plating layer 34c of third external electrode 30c is preferably in contact with the surface of each of ends 44c1, 44c2 of the portion of third organic layer 33c in contact with multilayer body 12.

Fourth organic layer 33d covers fourth base electrode layer 32d, extended therefrom, and disposed so as to cover the surface of multilayer body 12. That is, fourth organic layer 33d includes a portion covering fourth base electrode layer 32d and a portion (hereinafter, a portion in contact with multilayer body 12) that is in contact with multilayer body 12 in a portion adjacent to both sides of first end surface 12e and second end surface 12f with respect to fourth base electrode layer 32d and covers the surface thereof. Fourth organic layer 33d covers first end surface 12e of fourth base electrode layer 32d and ends 40d1, 40d2 closer to second end surface 12f. The portion of fourth organic layer 33d in contact with multilayer body 12 is disposed on first principal plane 12a, second principal plane 12b, and second side surface 12d in the surface of multilayer body 12. One end portions 44d1, 44d2 of the portion of fourth organic layer 33d in contact with multilayer body 12 are in contact with each other so as to cover end 40d1, 40d2 of fourth base electrode layer 32d. A portion of fourth organic layer 33d that is in contact with multilayer body 12 is disposed so as to extend from each of ends 40d1, 40d2 of fourth base electrode layer 32d to at least a portion of the surface of multilayer body 12, and each of the other ends 45d1, 45d2 is located closer to each of first end surface 12e and second end surface 12f than each of ends 50d1, 50d2 of fourth plating layer 34d and exposed. Furthermore, each of ends 50d1, 50d2 of fourth plating layer 34d of fourth external electrode 30d is preferably in contact with the surface of each of ends 44d1, 44d2 of the portion of fourth organic layer 33d in contact with multilayer body 12.

Multilayer body 12 is exposed between first organic layer 33a, third organic layer 33c, and fourth organic layer 33d. Similarly, multilayer body 12 is exposed between second organic layer 33b, third organic layer 33c, and fourth organic layer 33d. That is, there is a portion where organic layer 33 does not exist between first external electrode 30a and second external electrode 30b of the three-terminal multilayer ceramic capacitor 10 and third external electrode 30c and fourth external electrode 30d. Thus, the surface of multilayer body 12 is exposed, so that fixing strength with the conductive adhesive used at the time of mounting is improved, and the decrease in mounting reliability can be prevented.

In the Cu concentration and the Si concentration on the surface of first organic layer 33a in the portion facing first plating layer 34a, the atomic concentration ratio of Si to Cu (Si/Cu atomic concentration ratio) is greater than or equal to about 1.5% and less than or equal to about 5.5%, and surface roughness on the surface of first organic layer 33a in the portion facing first plating layer 34a is greater than 0.334 and less than or equal to about 0.371. Here, for example, when the substrate is deflected due to thermal shock or the like while the three-terminal multilayer ceramic capacitor is mounted on the substrate, the stress that causes the generation of cracks, the deformation or the like in the dielectric layer or the internal electrode layer is generated in the three-terminal multilayer ceramic capacitor. However, when the stress is generated, first plating layer 34a is easily peeled off from first organic layer 33a on first base electrode layer 32a. That is, the stress is dispersed by peeling first plating layer 34a from first organic layer 33a on the first base electrode layer 32a.

Further, in the Cu concentration and the Si concentration on the surface of second organic layer 33b in the portion facing second plating layer 34b, the atomic concentration ratio of Si to Cu is greater than or equal to about 1.5% and less than or equal to about 5.5%, and the surface roughness on the surface of second organic layer 33b in the portion facing second plating layer 34b is greater than or equal to about 0.334 and less than or equal to about 0.371. As described above, when the stress is generated, second plating layer 34b is easily peeled from second organic layer 33b on second base electrode layer 32b. That is, the stress is dispersed by peeling second plating layer 34b from second organic layer 33b on second base electrode layer 32b.

As described above, by adjusting the atomic concentration ratio of Si to Cu and the surface roughness of first and second organic layers 33a, 33b as described above, the generation of cracks, the deformation, and the like in dielectric layer 14 or internal electrode layer 16 can be prevented, and defective metal exposure of first and second base electrode layers 32a, 32b can be prevented. Here, when the atomic concentration ratio of Si to Cu is more than about 5.5%, the coverage of first and second organic layers 33a, 33b with respect to first and second base electrode layers 32a, 32b increases. As a result, first and second plating layers 34a, 34b are hardly formed on first and second base electrode layers 32a, 32b, and first and second base electrode layers 32a, 32b are easily exposed. Furthermore, when the atomic concentration ratio of Si to Cu is less than about 1.5%, the coverage of first and second organic layers 33a, 33b with respect to first and second base electrode layers 32a, 32b decreases. As a result, the adhesion strength between first and second base electrode layers 32a, 32b and first and second plating layers 34a, 34b increases, first and second plating layers 34a, 34b are less likely to be peeled off from first and second base electrode layers 32a, 32b, the stress cannot be dispersed, and the crack is likely to be generated in multilayer body 12. When the surface roughness of first and second organic layers 33a, 33b is less than about 0.334, first and second plating layers 34a, 34b are hardly formed on first and second base electrode layers 32a, 32b in combination with the atomic concentration ratio of Si to Cu, and first and second base electrode layers 32a, 32b are easily exposed. When the surface roughness of first and second organic layers 33a, 33b exceeds about 0.371, the adhesion strength between first and second base electrode layers 32a, 32b and first and second plating layers 34a, 34b increases in combination with the atomic concentration ratio of Si to Cu, first and second plating layers 34a, 34b are hardly peeled off from first and second base electrode layers 32a, 32b, the stress cannot be dispersed, and the crack is easily generated in multilayer body 12.

In the Cu concentration and the Si concentration on the surface of third organic layer 33c in the portion facing third plating layer 34c, the atomic concentration ratio of Si to Cu is greater than or equal to about 0.8% and less than or equal to about 2.8%, and the surface roughness on the surface of third organic layer 33c in the portion facing third plating layer 34c is greater than or equal to about 0.352 and less than or equal to about 0.395. When the stress is generated, third plating layer 34c is easily peeled from third organic layer 33c on third base electrode layer 32c. That is, the stress is dispersed by peeling third plating layer 34c from third organic layer 33c on third base electrode layer 32c.

Further, in the Cu concentration and the Si concentration on the surface of fourth organic layer 33d in the portion facing fourth plating layer 34d, the atomic concentration ratio of Si to Cu is greater than or equal to about 0.8% and less than or equal to about 2.8%, and the surface roughness on the surface of fourth organic layer 33d in the portion facing fourth plating layer 34d is greater than or equal to about 0.352 and less than or equal to about 0.395. When the stress is generated, fourth plating layer 34d is easily peeled from fourth organic layer 33d on fourth base electrode layer 32d. That is, the stress is dispersed by peeling fourth plating layer 34d from fourth organic layer 33d on fourth base electrode layer 32d.

As described above, by adjusting the atomic concentration ratio of Si to Cu and the surface roughness of third and fourth organic layers 33c, 33d as described above, the generation of cracks, the deformation, and the like in the dielectric layer and the internal electrode layer can be prevented, and a plating turning-up defect can be prevented. Here, when the atomic concentration ratio of Si to Cu is more than about 2.8%, the coverage of third and fourth organic layers 33c, 33d with respect to third and fourth base electrode layers 32c, 32d increases. As a result, the adhesion strength between third and fourth base electrode layers 32c, 32d and third and fourth plating layers 34c, 34d is reduced, and third and fourth plating layers 34c, 34d are easily turned up. When the atomic concentration ratio of Si to Cu is less than about 0.8%, the coverage of third and fourth organic layers 33c, 33d with respect to third and fourth base electrode layers 32c, 32d decreases. As a result, the adhesion strength between third and fourth base electrode layers 32c, 32d and third and fourth plating layers 34c, 34d is increased, third and fourth plating layers 34c, 34d are hardly peeled off from third and fourth base electrode layers 32c, 32d, the stress cannot be dispersed, and the crack is easily generated in multilayer body 12. When the surface roughness of third and fourth organic layers 33c, 33d is less than about 0.352, the adhesion strength between third and fourth base electrode layers 32c, 32d and third and fourth plating layers 34c, 34d decreases in combination with the atomic concentration ratio of Si to Cu, and the plating turning-up defect of third and fourth plating layers 34a, 34b is likely to be generated. In addition, when the surface roughness of third and fourth organic layers 33c, 33d exceeds about 0.395, the adhesion strength between third and fourth base electrode layers 32c, 32d and third and fourth plating layers 34c, 34d increases in combination with the atomic concentration ratio of Si to Cu, third and fourth plating layers 34c, 34d are less likely to be peeled from third and fourth base electrode layers 32c, 32d, the stress cannot be dispersed, and the crack is likely to be generated in multilayer body 12.

As described above, because first to fourth plating layers 34a to 34d are easily peeled off from first to fourth base electrode layers 32a to 32d, the stress applied to three-terminal multilayer ceramic capacitor 10 is dispersed, so that the degree of freedom in design can be increased while preventing the generation of cracks, the deformation, and the like in dielectric layer 14 or internal electrode layer 16 of three-terminal multilayer ceramic capacitor 10. As a result, the reliability of three-terminal multilayer ceramic capacitor 10 can be improved. Here, the crack is defined as a crack that develops from the outer layer portion (first and second principal plane-side outer layer portions 20a, 20b, first and second side surface-side outer layer portions 22a, 22b, and first and second end surface-side outer layer portions 24a, 24b) toward internal electrode layer 16 as a starting point from the external electrode end.

The atomic concentration ratio between first and second organic layers 33a, 33b is measured by XPS (X-ray photoelectron spectroscopy). More specifically, a cut on the order of about 150 µm square is made in the central portion of first external electrode 30a located on first principal plane 12a or second principal plane 12b or first side surface 12c or second side surface 12d and the central portion of first external electrode 30a located on first end surface 12e, first plating layer 34a at this portion is peeled off, the surface is subjected to XPS (X-ray photoelectron spectroscopy) analysis, and after the background treatment, the atomic concentration ratio is calculated based on peak areas of Cu2p and Si2p and a sensitivity coefficient of the measuring device. Next, a cut groove of about 150 µm square is made in the central portion of second external electrode 30b located on first principal plane 12a or second principal plane 12b or first side surface 12c or second side surface 12d and the central portion of second external electrode 30b located on second end surface 12f, second plating layer 34b at this portion is peeled off, the surface is subjected to XPS (X-ray photoelectron spectroscopy) analysis, and after the background treatment, the atomic concentration ratio is calculated based on peak areas of Cu2p and Si2p and a sensitivity coefficient of the measurement device. Finally, the values calculated by first and second external electrodes 30a, 30b can be averaged to obtain the atomic concentration ratios of first and second organic layers 33a, 33b. Furthermore, detailed measurement conditions by XPS are as follows.

Device name: VersaProbe manufactured by ULVAC-PHI
X-ray: Monochromatic Al-Kα ray
X-ray diameter: 100 µm in half-value beam width
Photoelectron extraction angle: 45°
Measured spectra: Si2p, Cu2p
Charging compensation method during measurement: Irradiation with electron beam and ion beam The atomic concentration ratios of third and fourth organic layers 33c, 33d are also measured by XPS (X-ray photoelectron spectroscopy). More specifically, first, a cut groove of about 150 µm square is made in the central portion of third external electrode 30c located on first principal plane 12a or second principal plane 12b and the central portion of third external electrode 30c located on first side surface 12c, third plating layer 34c in this portion is peeled off, the surface is subjected to XPS (X-ray photoelectron spectroscopy) analysis, and after the background treatment, the atomic concentration ratio is calculated based on the peak areas of Cu2p and Si2p and the sensitivity coefficient of the measuring device. Subsequently, a cut groove of about 150 µm square is made in the central portion of fourth external electrode 30d located on first principal plane 12a or second principal plane 12b of fourth external electrode 30d and the central portion of fourth external electrode 30d located on second side surface 12d, fourth plating layer 34d in this portion is peeled off, the surface is subjected to XPS (X-ray photoelectron spectroscopy) analysis, and after the background treatment, the atomic concentration ratio is calculated based on the peak areas of Cu2p and Si2p and the sensitivity coefficient of the measuring device. Finally, the values calculated by third and fourth external electrodes 30c, 30d can be averaged to obtain the atomic concentration ratios of third and fourth organic layers 33c, 33d. In addition, the detailed measurement conditions by XPS are the same as those described above.

The surface roughness of first and second organic layers 33a, 33b can be measured with the laser microscope. More specifically, first, the cut groove of about 150 µm square is made in the central portion of first external electrode 30a located on first principal plane 12a or second principal plane 12b or first side surface 12c or second side surface 12d and the central portion of first external electrode 30a located on first end surface 12e, and first plating layer 34a at this portion is peeled off, and the surface roughness of first organic layer 33a is measured with the laser microscope. Subsequently, the cut groove of about 150 µm square is made in the central portion of second external electrode 30b located on first principal plane 12a or second principal plane 12b or first side surface 12c or second side surface 12d and the central portion of second external electrode 30b located on second end surface 12f, and second plating layer 34b at this portion is peeled off, and the surface roughness of second organic layer 33b is measured with the laser microscope. Finally, the values calculated by first and second external electrodes 30a, 30b can be averaged to obtain the surface roughness of first and second organic layers 33a, 33b. In addition, detailed measurement conditions using the laser microscope are as follows.

Device name: VK-X 1000
Magnification: 50 times
Scan mode: Laser confocal
Measurement quality: High accuracy
Pitch: 0.1 µm The surface roughness of third and fourth organic layers 33c, 33d can also be measured with the laser microscope. More specifically, first, the cut groove of about 150 µm square is made in the central portion of third external electrode 30c located on first principal plane 12a or second principal plane 12b and the central portion of third external electrode 30c located on first side surface 12c, third plating layer 34c in this portion is peeled off, and the surface roughness of third organic layer 33c is measured with the laser microscope. Subsequently, the cut groove of about 150 µm square is made in the central portion of fourth external electrode 30d located on first principal plane 12a or second principal plane 12b and the central portion of fourth external electrode 30d located on second side surface 12d, and fourth plating layer 34d in this portion is peeled off, and the surface roughness of fourth organic layer 33d is measured with the laser microscope. Finally, the values calculated by third and fourth external electrodes 30c, 30d can be averaged to obtain third and fourth organic layers 33c, 33d. In addition, the detailed measurement conditions using the laser microscope are the same as those described above.

In the configuration of the above preferred embodiment, the first to fourth organic layers 33a to 33d are disposed so as to cover the surface of multilayer body 12, so that the adhesion strength between multilayer body 12 and first to fourth organic layers 33a to 33d is increased. Accordingly, first to fourth plating layers 34a to 34d are easily peeled off from first to fourth organic layers 33a to 33d on first to fourth base electrode layers 32a to 32d. This also makes it possible to prevent the generation of cracks, the deformation, and the like in dielectric layers 14 or internal electrode layers 16 of three-terminal multilayer ceramic capacitor 10. In addition, first to fourth organic layers 33a to 33d cover the surface of multilayer body 12, so that the moisture and the like can be prevented from invading the inside of three-terminal multilayer ceramic capacitor 10 from between multilayer body 12 and first to fourth organic layers 33a to 33d. This makes it possible to prevent the defect such as the decrease in reliability of three-terminal multilayer ceramic capacitor 10.

Preferably the adhesion strength between multilayer body 12 and first base electrode layer 32a is larger than the adhesion strength between first organic layer 33a and first plating layer 34a, and the adhesion strength between multilayer body 12 and second base electrode layer 32b is larger than the adhesion strength between second organic layer 33b and second plating layer 34b (first relationship). Thus, first plating layer 34a is more easily peeled from first organic layer 33a on first base electrode layer 32a than first base electrode layer 32a is peeled from multilayer body 12, and second plating layer 34b is more easily peeled from second organic layer 33b on second base electrode layer 32b than second base electrode layer 32b is peeled from multilayer body 12. For this reason, the stress applied to three-terminal multilayer ceramic capacitor 10 is dispersed by the peeling, so that the generation of cracks, the deformations, and the like in dielectric layers 14 or internal electrode layers 16 of three-terminal multilayer ceramic capacitor 10 can be prevented. Furthermore, the adhesion of first base electrode layer 32a to multilayer body 12 can be maintained, and the adhesion of second base electrode layer 32b to multilayer body 12 can be maintained. Consequently, the moisture and the like can be prevented from invading the inside of three-terminal multilayer ceramic capacitor 10 from between first and second base electrode layers 32a, 32b and multilayer body 12. This makes it possible to prevent the defect such as the decrease in reliability of three-terminal multilayer ceramic capacitor 10.

In addition to or instead of the first relationship, preferably the adhesion strength between multilayer body 12 and third base electrode layer 32c is larger than the adhesion strength between third organic layer 33c and third plating layer 34c, and the adhesion strength between multilayer body 12 and fourth base electrode layer 32d is larger than the adhesion strength between fourth organic layer 33d and fourth plating layer 34d (second relationship). Thus, third plating layer 34c is more easily peeled from third organic layer 33c on third base electrode layer 32c than third base electrode layer 32c is peeled from multilayer body 12, and fourth plating layer 34d is more easily peeled from fourth organic layer 33c on fourth base electrode layer 32d than fourth base electrode layer 32d is peeled from multilayer body 12. Consequently, similarly to the first relationship, the invasion of the moisture and the like into three-terminal multilayer ceramic capacitor 10 can be prevented while the generation of cracks, the deformation, and the like in dielectric layers 14 or internal electrode layers 16 of three-terminal multilayer ceramic capacitor 10 is prevented.

In addition, preferably the adhesion strength between multilayer body 12 and first organic layer 33a is larger than the adhesion strength between first organic layer 33a and first plating layer 34a, and the adhesion strength between multilayer body 12 and second organic layer 33b is larger than the adhesion strength between second organic layer 33b and second plating layer 34b (third relationship). Thus, first plating layer 34a is more easily peeled from first organic layer 33a than first organic layer 33a is peeled from multilayer body 12, and second plating layer 34b is more easily peeled from second organic layer 33b than second organic layer 33b is peeled from multilayer body 12. Consequently, similarly to the first and second relationships, the invasion of the moisture and the like into three-terminal multilayer ceramic capacitor 10 can be prevented while the generation of cracks, the deformation, and the like in dielectric layers 14 or internal electrode layers 16 of three-terminal multilayer ceramic capacitor 10 is prevented.

In addition to or instead of the third relationship, preferably the adhesion strength between multilayer body 12 and third organic layer 33c is larger than the adhesion strength between third organic layer 33c and third plating layer 34c, and the adhesion strength between multilayer body 12 and fourth organic layer 33d is larger than the adhesion strength between fourth organic layer 33d and fourth plating layer 34d (fourth relationship). Thus, third plating layer 34c is more easily peeled from third organic layer 33c than third organic layer 33c is peeled from multilayer body 12, and fourth plating layer 34d is more easily peeled from fourth organic layer 33d than fourth organic layer 33d is peeled from multilayer body 12. Consequently, similarly to the third relationship, the invasion of the moisture and the like into three-terminal multilayer ceramic capacitor 10 can be prevented while the generation of cracks, the deformation, and the like in dielectric layers 14 or internal electrode layers 16 of three-terminal multilayer ceramic capacitor 10 is prevented.

First and second organic layers 33a, 33b preferably include an organosilicon compound. For example, decyltrimethoxysilane, n-propyltrimethoxysilane, octyltriethoxysilane, or the like is used as the organosilicon compound. In particular, as first and second organic layers 33a, 33b, an organosilicon compound having a structure of multifunctional alkoxysilane $Si-(C_nH_{2n+1})_3$ and including an N element is preferably used. Thus, first and second organic layers 33a, 33b are reliably formed on the surfaces of first and second base electrode layers 32a, 32b and/or multilayer body 12. That is, because the organosilicon compound is strongly covalently bonded to the surface of base electrode layer 32 and/or the surface of multilayer body 12 through to hydrolysis reaction and a dehydration condensation reaction, first and second organic layers 33a, 33b having high adhesion strength to the surfaces of first and second base electrode layers 32a, 32b and/or the surface of multilayer body 12 are formed. This makes it possible to attach first and second organic layers 33a, 33b to the surfaces of first and second base electrode layers 32a, 32b and/or multilayer body 12 while the defect such as the reliability is prevented.

In addition to or instead of this, preferably third and fourth organic layers 33c, 33d also include the organosilicon compound similarly to first and second organic layers 33a, 33b. Thus, similarly to the above, third and fourth organic layers 33c, 33d are reliably formed on the surfaces of third and fourth base electrode layers 32c, 32d and/or multilayer body 12. That is, the organosilicon compound forms third and fourth organic layers 33c, 33d having the high adhesion strength with the surfaces of third and fourth base electrode layers 32c, 32d and/or multilayer body 12. This makes it possible to attach third and fourth organic layers 33c, 33d to the surfaces of third and fourth base electrode layers 32c, 32d and/or multilayer body 12 while the defect such as the reliability is prevented.

The thicknesses of first and second organic layers 33a, 33b are preferably greater than or equal to about 1 nm and less than or equal to about 1 μm. More preferably, the thicknesses of first and second organic layers 33a, 33b are greater than or equal to about 100 nm and less than or equal to about 500 nm. In addition to or instead of this, the thicknesses of third and fourth organic layers 33c, 33d are preferably greater than or equal to about 1 nm and less than or equal to about 1 μm. More preferably, the thicknesses of third and fourth organic layers 33c, 33d are greater than or equal to about 100 nm and less than or equal to about 500 nm. This makes it possible to reduce the thickness of external electrode 30 within the standard dimensions while the generation of cracks is prevented in three-terminal multilayer ceramic capacitor 10, so that the degree of freedom in design can be increased. In addition, defective plating and detachment of three-terminal multilayer ceramic capacitor 10 are prevented.

As illustrated in FIG. 6, a dimension $d_1$ (that is, the dimension in length direction L from a point 42 of first base electrode layer 32a to a point 46 of first organic layer 33a on the side of second end surface 12f) of a portion of first organic layer 33a in contact with multilayer body 12 in length direction L is preferably greater than or equal to about 5 μm and less than or equal to about 100 μm. The same applies to second organic layer 33b. This makes it possible to reliably peel base electrode layer 32 and plating layer 34 from each other without causing the defect such as defective solderability.

The thickness of organic layer 33 at the portion disposed on multilayer body 12 is preferably larger than the thickness of organic layer 33 at the portion disposed on base electrode layer 32. Thus, base electrode layer 32 and plating layer 34 can be reliably peeled off. For example, the thickness of the portion of first organic layer 33a disposed on multilayer body 12 is preferably larger than the thickness of the portion of first organic layer 33a disposed on first base electrode layer 32a. Thus, first base electrode layer 32a and first plating layer 34a can be reliably peeled off. The same applies to second to fourth organic layers 33b to 33d.

The dimension in length direction z of three-terminal multilayer ceramic capacitor 10 including multilayer body 12 and first to fourth external electrodes 30a to 30d is defined as an L dimension, the dimension in height direction x of three-terminal multilayer ceramic capacitor 10 including multilayer body 12 and first to fourth external electrodes 30a to 30d is defined as a T dimension, and the dimension in width direction y of three-terminal multilayer ceramic capacitor 10 including multilayer body 12 and first to fourth external electrodes 30a to 30d is defined as a W dimension.

The dimensions of three-terminal multilayer ceramic capacitor 10 are not particularly limited, but the L dimension in length direction z is greater than or equal to about 1.0 mm and less than or equal to about 3.2 mm, the W dimension in width direction y is greater than or equal to about 0.5 mm and less than or equal to about 2.5 mm, and the T dimension in height direction x is greater than or equal to about 0.3 mm and less than or equal to about 2.5 mm. The dimensions of three-terminal multilayer ceramic capacitor 10 can be measured with a microscope.

2. Method for Manufacturing Three-Terminal Multilayer Ceramic Capacitor

A method for manufacturing the three-terminal multilayer ceramic capacitor will be described below.

First, a dielectric sheet for a dielectric layer and conductive paste for an internal electrode layer are prepared. The dielectric sheet and the conductive paste for the internal electrode layer include a binder and a solvent. The binder and the solvent may be known.

For example, the conductive paste for the internal electrode layer is printed on the dielectric sheet in a predetermined pattern by screen printing or gravure printing. Thus, the dielectric sheet on which the pattern of the first internal electrode layer is formed and the dielectric sheet on which the pattern of the second internal electrode layer is formed are prepared. More specifically, a screen printing plate used to print the first internal electrode layer and a screen printing plate used to print the second internal electrode layer are separately prepared, and a printing machine capable of separately printing the two types of screen printing plates can be used to print a pattern of each internal electrode layer.

Subsequently, a predetermined number of dielectric sheets for outer layers on which the pattern of the internal electrode layer is not printed is laminated to form the portion that becomes the second principal surface-side outer layer on the second principal surface side. Then, the dielectric sheet on which the pattern of the first internal electrode layer is printed and the dielectric sheet on which the pattern of the second internal electrode layer is printed are sequentially laminated on the portion that becomes the second principal plane-side outer layer so as to have the structure according to a preferred embodiment of the present invention, thus forming the portion that becomes the inner layer portion. The portion that becomes the first principal plane-side outer layer on the first principal plane side is formed by laminating the predetermined number of dielectric sheets for the outer layers on which the pattern of the internal electrode layer is not printed on the portion that becomes the inner layer portion. Thus, the multilayer sheet is prepared.

Subsequently, the multilayer sheet is pressed in a multilayer direction by isostatic pressing or the like to prepare a multilayer block.

Then, the multilayer block is cut into a predetermined size to cut out a multilayer chip. At this point, the corner and the ridge of the multilayer chip may be rounded by barrel polishing or the like.

Subsequently, the cut multilayer chip is baked to produce the multilayer body. The baking temperature depends on the material of the dielectric layer or the internal electrode layer, but is preferably greater than or equal to about 900° C. and less than or equal to about 1400° C.

Subsequently, base electrode layer 32 is formed on multilayer body 12 obtained by baking. Each manufacturing method when base electrode layer 32 is a baked layer, a conductive resin layer, or a thin film layer will be described.

Manufacturing Method when Base Electrode Layer is Baked Layer

Third base electrode layer 32c of third external electrode 30c is formed on first side surface 12c of multilayer body 12 obtained by baking, and fourth base electrode layer 32d of fourth external electrode 30d is formed on second side surface 12d of multilayer body 12.

When the baked layer is formed as base electrode layer 32, the conductive paste including a glass component and a metal component is applied, and then a baking processing is performed to form the baked layer as base electrode layer 32. The temperature of the baking treatment at this time is preferably greater than or equal to about 700° C. and less than or equal to about 900° C.

At this point, various methods can be used as the method for forming the baked layer. For example, a method in which the conductive paste is extruded from a slit and applied can be used. In this method, base electrode layer 32 can be formed not only on first side surface 12c and second side surface 12d but also on a portion of first principal plane 12a and a portion of second principal plane 12b by increasing an extrusion amount of the conductive paste.

Further, base electrode layer 32 can also be formed using a roller transfer method. In the case of the roller transfer method, when base electrode layer 32 is formed not only on first side surface 12c and second side surface 12d, but also on a portion of first principal plane 12a and a portion of second principal plane 12b, base electrode layer 32 can be formed on a portion of first principal plane 12a and a portion of second principal plane 12b by increasing the pressing pressure at the time of roller transfer.

Subsequently, first base electrode layer 32a of first external electrode 30a is formed on first end surface 12e of multilayer body 12 obtained by baking, and second base electrode layer 32b of second external electrode 30b is formed on second end surface 12f of multilayer body 12.

Similarly to the formation of base electrode layers 32c, 32d of third and fourth external electrodes 30c, 30d, when the baked layer is formed as base electrode layers 32a, 32b of first and second external electrodes 30a, 30b, the conductive paste including the glass component and the metal component is applied, and then the baking treatment is performed to form the baked layer as base electrode layers 32a, 32b. The temperature of the baking treatment at this time is preferably greater than or equal to about 700° C. and less than or equal to about 900° C. In addition, base electrode layers 32a, 32b extending not only to first and second end surfaces 12e, 12f but also to a portion of first principal plane 12a and a portion of second principal plane 12b, a portion of first side surface 12c, and a portion of second side surface 12d can be formed using the DIP method.

Furthermore, as the method for forming the baked layer as base electrode layer 32 of first and second external electrode 30a, 30b, the baked layer can be formed by a method for extruding and applying the conductive paste from the slit or the roller transfer method.

Regarding the baking treatment, third base electrode layer 32c of third external electrode 30c, fourth base electrode layer 32d of fourth external electrode 30d, first base electrode layer 32a of first external electrode 30a, and second base electrode layer 32b of second external electrode 30b may be simultaneously baked, or third base electrode layer 32c of third external electrode 30c and fourth base electrode layer 32d of fourth external electrode 30d and first base electrode layer 32a of first external electrode 30a and second base electrode layer 32b of second external electrode 30b may be separately baked.

Manufacturing Method when Base Electrode Layer is Conductive Resin Layer

When base electrode layer 32 (first to fourth base electrode layers 32a to 32d) is formed of the conductive resin layer, the conductive resin layer can be formed by the following method. The conductive resin layer may be formed on the surface of the baked layer, or directly formed alone on multilayer body 12 without forming the baked layer.

As the method for forming the conductive resin layer, a conductive resin paste including a thermosetting resin and a metal component is applied onto the baked layer or multilayer body 12, and heat treatment is performed at a temperature greater than or equal to about 250° C. and less than or equal to about 550° C. to thermally cure the resin, thereby forming the conductive resin layer. An atmosphere during the heat treatment at this time is preferably an $N_2$ atmosphere. In addition, in order to prevent scattering of the resin and to prevent oxidation of various metal components, an oxygen concentration is preferably inhibited to less than or equal to about 100 ppm.

As the method for applying the conductive resin paste, similar to the method for forming base electrode layer 32 as the baked layer, the conductive resin paste can be formed by, for example, a method in which the conductive resin paste is extruded from the slit and applied or the roller transfer method.

Manufacturing Method when Base Electrode Layer is Thin Film Layer

When base electrode layer 32 (first to fourth base electrode layers 32a to 32d) is formed as the thin film layer, masking or the like is performed, and base electrode layer 32 can be formed in the portion where external electrode 30 is to be formed by a thin film forming method such as a sputtering method or a vapor deposition method. Base electrode layer 32 formed of the thin film layer is a layer having the thickness less than or equal to about 1 μm on which metal particles are deposited.

The surfaces of first to fourth base electrode layers 32a to 32d formed as described above are subjected to sandblasting. The surface roughness of first to fourth organic layers 32a to 32d formed on first to fourth base electrode layers 33a to 33d can be adjusted by adjusting a treatment time, a discharge amount of sand, and the like.

Subsequently, first to fourth organic layers 33a to 33d are formed. First to fourth organic layers 33a to 33d are prepared as follows.

First to fourth organic layers 33a to 33d are formed by applying an organic treatment liquid or immersing multilayer body 12 in the organic treatment liquid so as to cover predetermined surfaces of first to fourth base electrode layers 32a to 32d of first to fourth external electrodes 30a to 30d and multilayer body 12. In a process of forming first to fourth organic layers 33a to 33d, the organic treatment liquid is applied three times.

Specifically, multilayer body 12 on which first to fourth base electrode layers 32a to 32d are baked is immersed in the first organic treatment liquid. After the immersion, the liquid draining treatment is performed, so that the first organic treatment liquid is scattered on first to fourth base electrode layers 32a to 32d and multilayer body 12 in which the surface is exposed. Thereafter, multilayer body 12 is dried at a temperature greater than or equal to about 100° C. and less than or equal to about 200° C. Thus, the organic layer by the first organic treatment liquid is formed in a scattered state over first to fourth base electrode layers 32a to 32d and entire multilayer body 12 in which the surface is exposed. The first organic treatment liquid is formed of a monofunctional silane coupling material, specifically, decyltrimethoxysilane, n-propyltrimethoxysilane, octyltriethoxysilane, or the like is used, and the organic treatment liquid is diluted to less than or equal to about 3% by weight in an alcohol solvent. The first organic treatment liquid is preferably the organosilicon compound.

Subsequently, multilayer body 12 is immersed in the second organic treatment liquid. Thereafter, multilayer body 12 is dried at a temperature greater than or equal to about 100° C. and less than or equal to about 200° C. Here, the organic layer formed by the first organic treatment liquid is scattered, and the organic layer formed by the second organic treatment liquid is hardly formed on the organic layer formed by the first organic treatment liquid. For this reason, the organic layer by the second organic treatment liquid is formed mainly on end 40a of first base electrode layer 32a, end 40b of second base electrode layer 32b, ends 40c1, 40c2 of third base electrode layer 32c, ends 40d1, 40d2 of fourth base electrode layer 32d, and the predetermined surface of multilayer body 12. As the second organic treatment liquid, a polyfunctional alkoxysilane $Si-(C_nH_{2n+1})_3$ is used, and the organic treatment liquid is diluted to greater than or equal to about 3% by weight and less than or equal to about 10% in the alcohol solvent. The second organic treatment liquid is preferably the organosilicon compound.

As described above, the first organic treatment liquid and the second organic treatment liquid are different from each other. In the first treatment with the organic treatment liquid, first to fourth organic layers 33a to 33d are formed on the surfaces of first to fourth base electrode layers 32a to 32d while ends 40a, 40b, 40c1, 40c2, 40d1, 40d2 are left. Then, in the second treatment of the organic treatment liquid, the second organic treatment liquid hardly adheres onto first to fourth organic layers 33a to 33d formed at the first time, and mainly adheres to ends 40a, 40b, 40c1, 40c2, 40d1, 40d2 to easily form the organic layer. As a result, first to fourth organic layers 33a to 33d can be sufficiently formed at end 40a of first base electrode layer 32a, end 40b of second base electrode layer 32b, ends 40c1, 40c2 of third base electrode layer 32c, and ends 40d1, 40d2 of fourth base electrode layer 32d, which are the starting points of the cracks. Accordingly, the effect of preventing the crack can be made more remarkable.

Subsequently, in a state where the third base electrode layer 32c and the fourth base electrode layer 32d are masked, multilayer body 12 is immersed in the third organic treatment liquid. Thereafter, multilayer body 12 is dried at a temperature greater than or equal to about 100° C. and less than or equal to about 200° C. Thus, the atomic concentration ratio of Si to Cu is made different between first organic layer 33a and second organic layer 33b, and third organic layer 33c and fourth organic layer 33d. As the third organic treatment liquid, a polyfunctional alkoxysilane Si—$(C_nH_{2n+1})_3$ is used, and the organic treatment liquid is diluted to greater than or equal to about 3% by weight and less than or equal to about 10% in the alcohol solvent. The third organic treatment liquid is preferably the organosilicon compound.

Subsequently, plating layers 34a to 34d are formed on portions of first to fourth organic layers 33a to 33d corresponding to first to fourth base electrode layers 32a to 33d. First plating layer 34a covers most of first base electrode layer 32a. In this case, end 50a of first plating layer 34a covers one end 44a of first organic layer 33a. Second plating layer 34b covers most of second base electrode layer 32b. In this case, end 50b of second plating layer 34b covers one end 44b of second organic layer 33b. Third plating layer 34c covers most of third base electrode layer 32c. In this case, ends 50c1, 50c2 of third plating layer 34c cover ends 44c1, 44c2 of third organic layer 33c. Fourth plating layer 34d covers most of fourth base electrode layer 32d. In this case, ends 50d1, 50d2 of fourth plating layer 34d cover ends 44d1, 44d2 of fourth organic layer 33d. Plating layer 34 is formed by sequentially forming a lower layer plating electrode (for example, a Ni plating layer) and an upper layer plating electrode (for example, a Sn plating layer). In performing the plating processing, either electrolytic plating or electroless plating may be adopted, but the electroless plating requires the pretreatment with a catalyst or the like in order to improve a plating deposition rate, and has a disadvantage that the process becomes complicated. Accordingly, it is usually preferable to adopt the electrolytic plating. Barrel plating is preferably used as the plating method.

Subsequently, a portion of the formed first to fourth organic layers 33a to 33d may be removed as necessary.

Plating electrodes may be provided on first side surface 12c, second side surface 12d, first end surface 12e, and second end surface 12f where internal electrode layer 16 of multilayer body 12 is exposed without providing base electrode layer 32. In this case, it can be formed by the following method.

The plating treatment is applied to first end surface 12e and second end surface 12f of multilayer body 12 to form a lower layer plating electrode connected to first extracting electrode portion 28a1 and second extracting electrode portion 28a2 of first internal electrode layer 16a. Similarly, first side surface 12c and second side surface 12d of multilayer body 12 are plated to form a lower layer plating electrode connected to third extracting electrode portion 28b1 and fourth extracting electrode portion 28b2 of second internal electrode layer 16b. As required, the upper plating electrode formed on the surface of the lower plating electrode may be formed similarly.

By the above method, three-terminal multilayer ceramic capacitor 10 capable of preventing the generation of cracks, the deformations, and the like in dielectric layers 14 or internal electrode layers 16 of multilayer body 12 and improving the performance or the reliability can be easily manufactured.

3. Experimental Example

Preferred ranges of the atomic concentration ratio of Si to Cu (Si/Cu atomic concentration ratio) and the surface roughness of the first to fourth organic layers were experimented with as follows. In the experiment, the three-terminal multilayer ceramic capacitors having different atomic concentration ratios of Si to Cu and different surface roughness of the first to fourth organic layers were manufactured and prepared by the manufacturing method according to a preferred embodiment of the present invention. Then, for these three-terminal multilayer ceramic capacitors, a gold exposure generation rate, a plating turn-up generation rate, and a deflection crack generation rate of the base electrode layer were confirmed. The experimental results will be described below.

(1) Configuration of Three-Terminal Multilayer Ceramic Capacitor

Dimensions of three-terminal multilayer ceramic capacitor: Length L: 1.15 mm, Width W: 0.65 mm, Height T: 0.45 mm
Dielectric material: $BaTiO_3$
Capacitance: 1 µF
Rated voltage: 6.3 V
Structure of internal electrode layer:
 Material of first internal electrode layer: Ni, thickness of 0.72 µm
 Material of second internal electrode layer: Ni, thickness of 0.70 µm
Structure of external electrode
<Structures of First and Second External Electrodes>
First and second base electrode layers: Baked layer including conductive metal (Cu) and glass component, thickness of 25 µm at central portion of first and second end surfaces
First and second organic layers:
Portion formed on surface of each of first and second base electrode layers was monofunctional silane coupling film made of decyltrimethoxysilane, and had thickness of 10 nm to 700 nm.
Ends of first and second base electrode layers and portion formed on surface of multilayer body 12 are formed of polyfunctional alkoxysilane Si—$(C_nH_{2n+1})_3$ composed of tris-(trimethoxysilylpropyl) isocyanurate.
Atomic concentration ratio of Si to Cu (Si/Cu atomic concentration ratio): 8 types illustrated in Table 1
Surface roughness: 8 types illustrated in Table 1

First and second plating layers: Two-layer structure of Ni plating layer (thickness: 4.2 μm) and Sn plating layer (thickness: 4.5 μm)

<Structures of Third and Fourth External Electrodes>

Third and fourth base electrode layers: Baked layer including conductive metal (Cu) and glass component, thickness of 18 μm at central portion of first and second side surfaces Third and fourth organic layers:

Portion formed on surface of each of third and fourth base electrode layers was monofunctional silane coupling film made of decyltrimethoxysilane, and had thickness of 10 nm to 700 nm.

Ends of third and fourth base electrode layers and the portion formed on surface of multilayer body 12 are formed of a polyfunctional alkoxysilane Si—$(C_nH_{2n+1})_3$ composed of tris-(trimethoxysilylpropyl) isocyanurate.

Atomic concentration ratio of Si to Cu (Si/Cu atomic concentration ratio): 8 types illustrated in Table 2

Surface roughness: 8 types illustrated in Table 2

Third and fourth plating layers: Two-layer structure of Ni plating layer (thickness: 3.3 μm) and Sn plating layer (thickness: 3.5 μm)

The measurement of the atomic concentration ratio and the measurement of the surface roughness are as described in the above preferred embodiment.

(2) Test Method (2-1) Method for Checking Plating Peeling Defect

The appearance of the surface of the three-terminal multilayer ceramic capacitor is observed using a stereoscopic microscope to check whether or plating stripping is generated. Specifically, the appearance of the three-terminal multilayer ceramic capacitor was checked using the stereoscopic microscope, and the case where Sn/Ni plating (first to fourth plating layers) was peeled off was determined to be unacceptable. The stereoscopic microscope was used while magnification is greater than or equal to about 20 times. The number of samples to be checked was 10,000.

(2-2) Method for Checking Metal Exposure Failure of Base Electrode Layer

In the method for checking defective metal exposure of the base electrode, first, Sn plating (first to fourth upper layer plating layers) of the three-terminal multilayer ceramic capacitor is eluted using a melt strip solution. Thereafter, the appearance of the three-terminal multilayer ceramic capacitor is checked using the stereoscopic microscope. The case where the first to fourth base electrode layers were covered with Ni plating (first to fourth lower layer plating layers) was determined to be acceptable, and the case where the metal of the first to fourth base electrode layers was exposed on the surface of the Ni plating was determined to be unacceptable. The stereoscopic microscope was used while magnification is greater than or equal to about 20 times. The number of samples to be confirmed was 1000.

(2-3) Method for Checking Deflection Crack Test

After LF solder paste is applied to a 1.6 mm thick JEITA-land FR4 substrate with a thickness of 150 μm, three-terminal multilayer ceramic capacitor 10 is mounted on the substrate. Thereafter, the substrate is bent with a push rod having a diameter of 5 μm from the back surface of the substrate on which the three-terminal multilayer ceramic capacitor is not mounted, and mechanical stress is applied to the substrate. A holding time at this time was 60 seconds, and a bending amount was 2.0 mm. After the substrate was bent, the three-terminal multilayer ceramic capacitor that was removed from the substrate, and sectional polishing was performed to observe the presence or absence of the crack. The sectional polishing was performed such that an LT surface (section in FIG. 4) of the three-terminal multilayer ceramic capacitor was exposed to a position of ½ in width direction W connecting the first end surface and the second end surface of the three-terminal multilayer ceramic capacitor.

(3) Experimental Results (3-1) Experimental Results for Each Si/Cu Atomic Concentration Ratio and Surface Roughness in First and Second Organic Layers

TABLE 1

| Sample number | 1 | 2 | 3 | 4 | 5 | 6 | 7 | 8 |
|---|---|---|---|---|---|---|---|---|
| Si/Cu atomic concentration ratio | 45.1 | 23.2 | 8.1 | 5.5 | 2.8 | 1.5 | 0.8 | 0.5 |
| Surface roughness RΔq | 0.310 | 0.331 | 0.323 | 0.334 | 0.352 | 0.371 | 0.395 | 0.417 |
| Metal exposure generation rate of base electrode layer | 0.70% | 0.80% | 0.80% | 0.10% | 0.00% | 0.00% | 0.00% | 0.00% |
| Plating turning-up generation rate | 0.00% | 0.00% | 0.00% | 0.00% | 0.00% | 0.00% | 0.00% | 0.00% |
| Deflection crack generation rate | 0.00% | 0.00% | 0.00% | 0.00% | 0.00% | 0.00% | 30.00% | 60.00% |

(3-2) Experimental Results for Each Si/Cu Atomic Concentration Ratio and Surface Roughness in Third and Fourth Organic Layers

TABLE 2

| Sample number | 9 | 10 | 11 | 12 | 13 | 14 | 15 | 16 |
|---|---|---|---|---|---|---|---|---|
| Si/Cu atomic concentration ratio | 45.1 | 23.2 | 8.1 | 5.5 | 2.8 | 1.5 | 0.8 | 0.5 |
| Surface roughness RAq | 0.310 | 0.331 | 0.323 | 0.337 | 0.352 | 0.371 | 0.395 | 0.417 |
| Metal exposure generation rate of base electrode layer | 0.00% | 0.00% | 0.00% | 0.00% | 0.00% | 0.00% | 0.00% | 0.00% |
| Plating turning-up generation rate | 0.01% | 0.01% | 0.01% | 0.01% | 0.00% | 0.00% | 0.00% | 0.00% |
| Deflection crack generation rate | 0.00% | 0.00% | 0.00% | 0.00% | 0.00% | 0.00% | 0.00% | 50.00% |

(3-3) Evaluation

From the results in Table 1, in the samples of sample numbers 1 to 3, the atomic concentration ratio of Si to Cu was larger than 5.5% in the first organic layer on the first end surface side and the second organic layer on the second end surface side of the multilayer body, so that the first and second base electrode layers were exposed. When the surface roughness of the first and second organic layers was less than 0.334, the exposure of the first and second base electrode layers was easily generated.

In the samples of sample numbers 7 and 8, the atomic concentration ratio of Si to Cu was less than 1.5%, so that the crack was likely to be generated. When the surface roughness of the first and second organic layers was more than 0.371, the crack was easily generated.

On the other hand, according to the samples of sample numbers 4 to 6, it has been discovered that the atomic concentration ratio of Si to Cu (Si/Cu atomic concentration ratio) is preferably greater than or equal to about 1.5% and less than or equal to about 5.5% in the Cu concentration and the Si concentration on the surfaces of the first and second organic layers. In addition, it has been discovered that the surface roughness of the first and second organic layers is preferably greater than or equal to about 0.334 and less than or equal to about 0.371.

From the results in Table 2, in the samples of sample numbers 9 to 12, the atomic concentration ratio of Si to Cu was more than 2.8% in the third organic layer on the first side surface side and the fourth organic layer on the second side surface side of the multilayer body, so that the plating turn-up defects of the third and fourth base electrode layers were likely to be generated. When the surface roughness of the third and fourth organic layers was less than 0.352, the plating turn-up defect of the third and fourth plating layers was easily generated.

In the sample of sample number 16, because the atomic concentration ratio of Si to Cu was less than 0.8%, the crack was likely to be generated. Furthermore, when the surface roughness of the third and fourth organic layers exceeded 0.395, the crack was likely to be generated.

On the other hand, according to the samples of sample numbers 13 to 15, it has been discovered that the atomic concentration ratio of Si to Cu is preferably greater than or equal to about 0.8% and less than or equal to about 2.8% in the Cu concentration and the Si concentration on the surfaces of the third and fourth organic layers. In addition, it has been discovered that the surface roughness of the third and fourth organic layers is preferably greater than or equal to about 0.352 and less than or equal to about 0.395.

The preferred embodiments are as described above, but the present invention is not limited thereto.

That is, various changes can be made in the mechanism, shape, material, quantity, position, disposition, and the like with respect to the preferred embodiments described above without departing from the scope of the technical ideas of preferred embodiments of the present invention, and these changes are included in the present invention.

Modifications of the preferred embodiments will be described. In the modifications, components corresponding to the components of the above preferred embodiments are denoted by the same reference numerals, and the detailed description thereof will be omitted.

Figure 9:
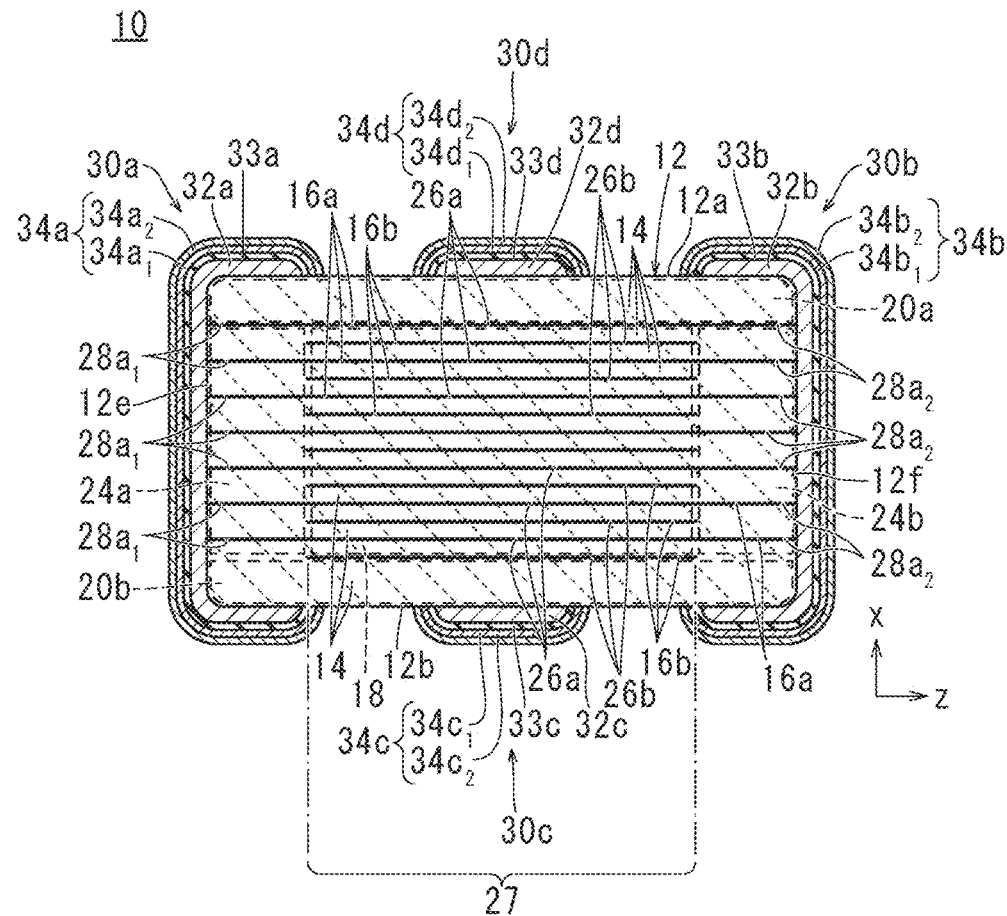
FIG. 9 is a sectional view illustrating an example of a three-terminal multilayer ceramic capacitor according to a modification of a preferred embodiment of the present invention.

(A) Mode in which Organic Layer is Formed Only in Portion Corresponding to Base Electrode Layer FIG. 9 is a sectional view illustrating an example of a three-terminal multilayer ceramic capacitor according to a modification of a preferred embodiment of the present invention. In FIG. 9, unlike the configuration disclosed in FIG. 4 in which first to fourth organic layers 33a to 33d extend from the end of base electrode layer 32 onto multilayer body 12, first to fourth organic layers 33a to 33d are formed so as to cover only first to fourth base electrode layers 32a to 32d. First to fourth plating layers 34a to 34d are formed so as to cover the entire surfaces of first to fourth organic layers 33a to 33d. Also in the three-terminal multilayer ceramic capacitor disclosed in FIG. 9, as in the above preferred embodiments, the generation of cracks, the deformations, and the like in dielectric layers 14 or internal electrode layers 16 of multilayer body 12 can be prevented, and the performance and the reliability can be improved.

Figure 10:
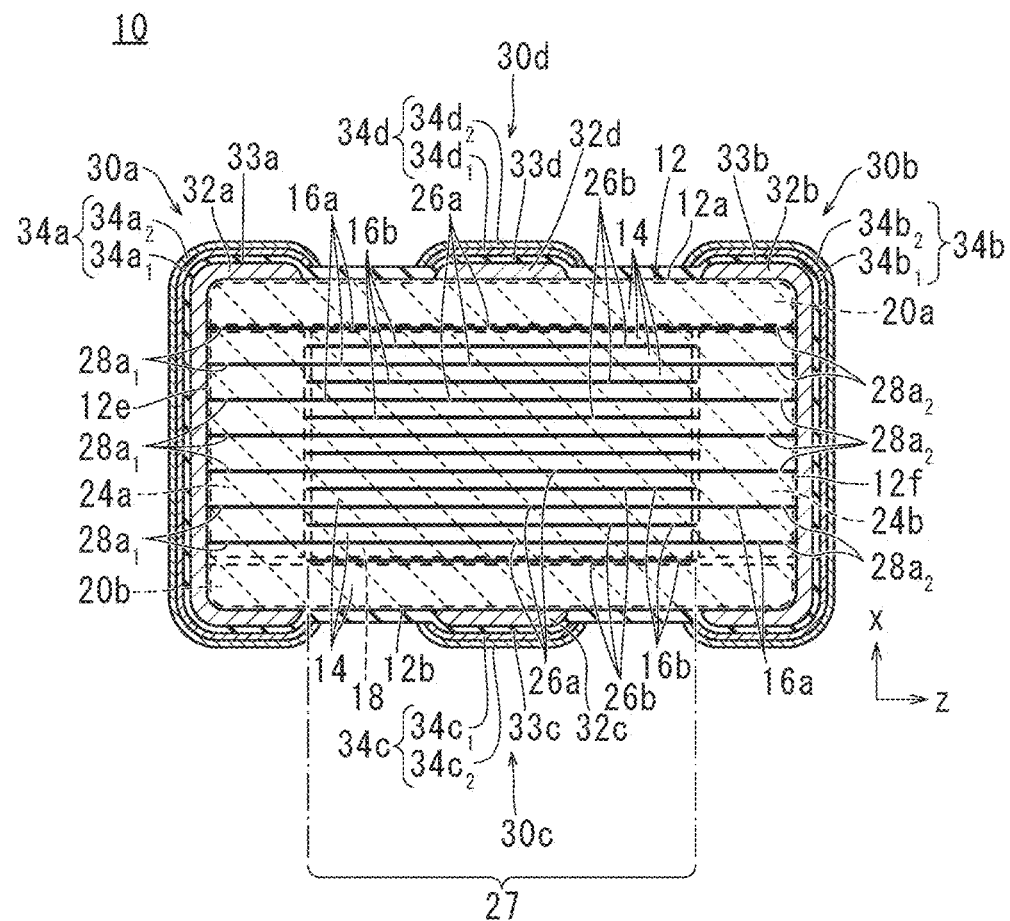
FIG. 10 is a sectional view illustrating an example of a three-terminal multilayer ceramic capacitor according to another modification of a preferred embodiment of the present invention.

(B) Mode in which Organic Layer is Formed on Entire Surface of Base Electrode Layer and Entire Surface of Multilayer Body FIG. 10 is a sectional view illustrating an example of a three-terminal multilayer ceramic capacitor according to another modification of a preferred embodiment of the present invention. In FIG. 10, unlike the configuration disclosed in FIG. 4, first to fourth organic layers 33a to 33d cover the entire surface on multilayer body 12 between first and third base electrode layers 32a, 32c, between first and fourth base electrode layers 32a, 32d, between second and third base electrode layers 32b, 32c, and between second and third base electrode layers 32b, 32c. Also in the three-terminal multilayer ceramic capacitor disclosed in FIG. 10, as in the above preferred embodiments, the generation of cracks, the deformations, and the like in dielectric layers 14 or internal electrode layers 16 of multilayer body 12 can be prevented, and the performance and the reliability can be improved.

Characteristic configurations disclosed in the above-described preferred embodiments of the present invention and its modifications are summarized as follows.

Supplementary Note 1

A three-terminal multilayer ceramic capacitor includes a multilayer body that includes a first principal plane and a second principal plane facing each other in a height direction, a first end surface and a second end surface facing each other in a length direction perpendicular or substantially perpendicular to the height direction, and a first side surface and a second side surface facing each other in a width direction perpendicular or substantially perpendicular to the height direction and the length direction, and includes a plurality of laminated dielectric layers, a plurality of first internal electrode layers located on the plurality of dielectric layers and extended to the first end surface and the second end surface, a plurality of second internal electrode layers located on the plurality of dielectric layers and extended to the first side surface and the second side surface, a first external electrode located on the first end surface and connected to the first internal electrode layer, a second external electrode located on the second end surface and connected to the first internal electrode layer, a third external electrode located on the first side surface, extending from the first side surface, located on a portion of the first principal plane and a portion of the second principal plane, and connected to the second internal electrode layer, and a fourth external electrode located on the second side surface, extending from the second side surface, located on a portion of the first principal plane and a portion of the second principal plane, and connected to the second internal electrode layer, in which the first external electrode includes a first base electrode layer including a conductive metal and a glass component, a first organic layer including an organosilicon compound covering the first base electrode layer, and a first plating layer located on the first organic layer, the second external electrode includes a second base electrode layer including a conductive metal and a glass component, a second organic layer including an organosilicon compound covering the second base electrode layer, and a second plating layer located on the second organic layer, the third external electrode includes a third base electrode layer including a conductive metal and a glass component, a third organic layer including an organosilicon compound covering the third base electrode layer, and a third plating layer located on the third organic layer, the fourth external electrode includes a fourth base electrode layer including a conductive metal and a glass component, a fourth organic layer including an organosilicon compound covering the fourth base electrode layer, and a fourth plating layer located on the fourth organic layer, the first organic layer covers the first base electrode layer, the second organic layer covers the second base electrode layer, an atomic concentration ratio of Si to Cu is greater than or equal to about 1.5% and less than or equal to about 5.5% in a Cu concentration and a Si concentration on a surface of the first organic layer in a portion facing the first plating layer, the atomic concentration ratio of Si to Cu is greater than or equal to about 1.5% and less than or equal to about 5.5% in the Cu concentration and the Si concentration on a surface of the second organic layer in a portion facing the second plating layer, a surface roughness of the portion facing the first plating layer on the surface of the first organic layer is greater than or equal to about 0.334 and less than or equal to about 0.371, a surface roughness of the portion facing the second plating layer on the surface of the second organic layer is greater than or equal to about 0.334 and less than or equal to about 0.371, the third organic layer covers the third base electrode layer, the fourth organic layer covers the fourth base electrode layer, the atomic concentration ratio of Si to Cu is greater than or equal to about 0.8% and less than or equal to about 2.8% in the Cu concentration and the Si concentration on a surface of the third organic layer in a portion facing the third plating layer, the atomic concentration ratio of Si to Cu is greater than or equal to about 0.8% and less than or equal to about 2.8% in the Cu concentration and the Si concentration on a surface of the fourth organic layer in a portion facing the fourth plating layer, a surface roughness of a portion facing the third plating layer on the surface of the third organic layer is greater than or equal to about 0.352 and less than or equal to about 0.395, and a surface roughness of the portion facing the fourth plating layer on the surface of the fourth organic layer is greater than or equal to about 0.352 and less than or equal to about 0.395.

Supplementary Note 2

In the three-terminal multilayer ceramic capacitor described in supplementary note 1, an adhesion strength between the multilayer body and the first base electrode layer is greater than an adhesion strength between the first organic layer and the first plating layer, and an adhesion strength between the multilayer body and the second base electrode layer is greater than an adhesion strength between the second organic layer and the second plating layer, and/or an adhesion strength between the multilayer body and the third base electrode layer is greater than an adhesion strength between the third organic layer and the third plating layer, and an adhesion strength between the multilayer body and the fourth base electrode layer is greater than an adhesion strength between the fourth organic layer and the fourth plating layer.

Supplementary Note 3

In the three-terminal multilayer ceramic capacitor described in supplementary note 1 or 2, the first organic layer and the second organic layer include organosilicon compounds having a structure of multifunctional alkoxysilane Si—$(C_nH_{2n+1})_3$ and including an N element, and/or the third organic layer and the fourth organic layer include organosilicon compounds having a structure of multifunctional alkoxysilane Si—$(C_nH_{2n+1})_3$ and including an N element.

Supplementary Note 4

In the three-terminal multilayer ceramic capacitor described in any one of supplementary notes 1 to 3, thicknesses of the first organic layer and the second organic layer are greater than or equal to about 1 nm and less than or equal to about 1 μm, and/or thicknesses of the third organic layer and the fourth organic layer are greater than or equal to about 1 nm and less than or equal to about 1 µm.

Supplementary Note 5

In the three-terminal multilayer ceramic capacitor described in supplementary note 4, the thicknesses of the first organic layer and the second organic layer are greater than or equal to about 100 nm and less than or equal to about 500 nm, and/or the thicknesses of the third organic layer and the fourth organic layer are greater than or equal to about 100 nm and less than or equal to about 500 nm.

Supplementary Note 6

In the three-terminal multilayer ceramic capacitor described in any one of supplementary notes 1 to 5, the first internal electrode layer includes a first opposing electrode portion opposed to the second internal electrode layer with the dielectric layer interposed between the first opposing electrode portion and the second internal electrode layer, a first extracting electrode portion extending from the first opposing electrode portion and extracted to the first end surface, and a second extracting electrode portion extending from the first opposing electrode portion and extracted to the second end surface, and the second internal electrode layer includes a second opposing electrode portion opposed to the first internal electrode layer with the dielectric layer interposed between the second opposing electrode portion and the first internal electrode layer, a third extracting electrode portion extending from the second opposing electrode portion and extracted to the first side surface, and a fourth extracting electrode portion extending from the second opposing electrode portion and extracted to the second side surface.

Supplementary Note 7

In the three-terminal multilayer ceramic capacitor described in any one of supplementary notes 1 to 6, the first organic layer covers at least a portion of a surface of the multilayer body from above the first base electrode layer, the second organic layer covers at least a portion of a surface of the multilayer body from above the second base electrode layer, the third organic layer covers at least a portion of a surface of the multilayer body from above the third base electrode layer, and the fourth organic layer covers at least a portion of a surface of the multilayer body from above the fourth base electrode layer.

Supplementary Note 8

In the three-terminal multilayer ceramic capacitor described in supplementary note 7, an adhesion strength between the multilayer body and the first organic layer is greater than the adhesion strength between the first organic layer and the first plating layer, and an adhesion strength between the multilayer body and the second organic layer is greater than the adhesion strength between the second organic layer and the second plating layer, and/or an adhesion strength between the multilayer body and the third organic layer is greater than the adhesion strength between the third organic layer and the third plating layer, and an adhesion strength between the multilayer body and the fourth organic layer is greater than the adhesion strength between the fourth organic layer and the fourth plating layer.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-terminal multilayer ceramic capacitor comprising:
a multilayer body that includes a first principal plane and a second principal plane facing each other in a height direction, a first end surface and a second end surface facing each other in a length direction perpendicular or substantially perpendicular to the height direction, and a first side surface and a second side surface facing each other in a width direction perpendicular or substantially perpendicular to the height direction and the length direction, and includes a plurality of laminated dielectric layers;
a plurality of first internal electrode layers located on the plurality of dielectric layers and extended to the first end surface and the second end surface;
a plurality of second internal electrode layers located on the plurality of dielectric layers and extended to the first side surface and the second side surface;
a first external electrode located on the first end surface and connected to the first internal electrode layer;
a second external electrode located on the second end surface and connected to the first internal electrode layer;
a third external electrode located on the first side surface, extending from the first side surface, located on a portion of the first principal plane and a portion of the second principal plane, and connected to the second internal electrode layer; and
a fourth external electrode located on the second side surface, extending from the second side surface, located on a portion of the first principal plane and a portion of the second principal plane, and connected to the second internal electrode layer; wherein
the first external electrode includes a first base electrode layer including a conductive metal and a glass component, a first organic layer including an organosilicon compound covering the first base electrode layer, and a first plating layer located on the first organic layer;
the second external electrode includes a second base electrode layer including a conductive metal and a glass component, a second organic layer including an organosilicon compound covering the second base electrode layer, and a second plating layer located on the second organic layer;
the third external electrode includes a third base electrode layer including a conductive metal and a glass component, a third organic layer including an organosilicon compound covering the third base electrode layer, and a third plating layer located on the third organic layer;
the fourth external electrode includes a fourth base electrode layer including a conductive metal and a glass component, a fourth organic layer including an organosilicon compound covering the fourth base electrode layer, and a fourth plating layer located on the fourth organic layer;
the first organic layer covers the first base electrode layer;
the second organic layer covers the second base electrode layer;
an atomic concentration ratio of Si to Cu is greater than or equal to about 1.5% and less than or equal to about 5.5% in a Cu concentration and a Si concentration on a surface of the first organic layer in a portion facing the first plating layer;

the atomic concentration ratio of Si to Cu is greater than or equal to about 1.5% and less than or equal to about 5.5% in the Cu concentration and the Si concentration on a surface of the second organic layer in a portion facing the second plating layer;

a surface roughness of the portion facing the first plating layer on the surface of the first organic layer is greater than or equal to about 0.334 and less than or equal to about 0.371;

a surface roughness of the portion facing the second plating layer on the surface of the second organic layer is greater than or equal to about 0.334 and less than or equal to about 0.371;

the third organic layer covers the third base electrode layer;

the fourth organic layer covers the fourth base electrode layer;

the atomic concentration ratio of Si to Cu is greater than or equal to about 0.8% and less than or equal to about 2.8% in the Cu concentration and the Si concentration on a surface of the third organic layer in a portion facing the third plating layer;

the atomic concentration ratio of Si to Cu is greater than or equal to about 0.8% and less than or equal to about 2.8% in the Cu concentration and the Si concentration on a surface of the fourth organic layer in a portion facing the fourth plating layer;

a surface roughness of the portion facing the third plating layer on the surface of the third organic layer is greater than or equal to about 0.352 and less than or equal to about 0.395; and a surface roughness of the portion facing the fourth plating layer on the surface of the fourth organic layer is greater than or equal to about 0.352 and less than or equal to about 0.395.

2. The three-terminal multilayer ceramic capacitor according to claim 1, wherein an adhesion strength between the multilayer body and the first base electrode layer is greater than an adhesion strength between the first organic layer and the first plating layer, and an adhesion strength between the multilayer body and the second base electrode layer is greater than an adhesion strength between the second organic layer and the second plating layer; and/or an adhesion strength between the multilayer body and the third base electrode layer is greater than an adhesion strength between the third organic layer and the third plating layer, and an adhesion strength between the multilayer body and the fourth base electrode layer is greater than an adhesion strength between the fourth organic layer and the fourth plating layer.

3. The three-terminal multilayer ceramic capacitor according to claim 1, wherein the first organic layer and the second organic layer are organosilicon compounds having a structure of multi-functional alkoxysilane $Si—(C_nH_{2n+1})_3$ and including an N element; and/or the third organic layer and the fourth organic layer are organosilicon compounds having a structure of multi-functional alkoxysilane $Si—(C_nH_{2n+1})_3$ and including an N element.

4. The three-terminal multilayer ceramic capacitor according to claim 1, wherein thicknesses of the first organic layer and the second organic layer are greater than or equal to about 1 nm and less than or equal to about 1 μm; and/or thicknesses of the third organic layer and the fourth organic layer are greater than or equal to about 1 nm and less than or equal to about 1 μm.

5. The three-terminal multilayer ceramic capacitor according to claim 4, wherein the thicknesses of the first organic layer and the second organic layer are greater than or equal to about 100 nm and less than or equal to about 500 nm; and/or the thicknesses of the third organic layer and the fourth organic layer are greater than or equal to about 100 nm and less than or equal to about 500 nm.

6. The three-terminal multilayer ceramic capacitor according to claim 1, wherein the first internal electrode layer includes:

a first opposing electrode portion opposed to the second internal electrode layer with the dielectric layer interposed between the first opposing electrode portion and the second internal electrode layer;

a first extracting electrode portion extending from the first opposing electrode portion and extracted to the first end surface; and a second extracting electrode portion extending from the first opposing electrode portion and extracted to the second end surface; and the second internal electrode layer includes:

a second opposing electrode portion opposed to the first internal electrode layer with the dielectric layer interposed between the second opposing electrode portion and the first internal electrode layer;

a third extracting electrode portion extending from the second opposing electrode portion and extracted to the first side surface; and a fourth extracting electrode portion extending from the second opposing electrode portion and extracted to the second side surface.

7. The three-terminal multilayer ceramic capacitor according to claim 1, wherein the first organic layer covers at least a portion of a surface of the multilayer body from above the first base electrode layer;

the second organic layer covers at least a portion of a surface of the multilayer body from above the second base electrode layer;

the third organic layer covers at least a portion of a surface of the multilayer body from above the third base electrode layer; and the fourth organic layer covers at least a portion of a surface of the multilayer body from above the fourth base electrode layer.

8. The three-terminal multilayer ceramic capacitor according to claim 7, wherein an adhesion strength between the multilayer body and the first organic layer is greater than the adhesion strength between the first organic layer and the first plating layer, and an adhesion strength between the multilayer body and the second organic layer is greater than the adhesion strength between the second organic layer and the second plating layer; and/or an adhesion strength between the multilayer body and the third organic layer is greater than the adhesion strength between the third organic layer and the third plating layer, and an adhesion strength between the multilayer body and the fourth organic layer is greater than the adhesion strength between the fourth organic layer and the fourth plating layer.

9. The three-terminal multilayer ceramic capacitor according to claim 1, wherein the multilayer body is rectangular or substantially rectangular.

10. The three-terminal multilayer ceramic capacitor according to claim 1, wherein the multilayer body includes side gaps.

11. The three-terminal multilayer ceramic capacitor according to claim 1, wherein the multilayer body includes end gaps.

12. The three-terminal multilayer ceramic capacitor according to claim 1, wherein each of the first base electrode layer, the second base electrode layer, the third base electrode layer, and the fourth base electrode layer includes a baked layer, a conductive resin layer, or a thin film layer.

13. The three-terminal multilayer ceramic capacitor according to claim 1, wherein each of the first external electrode, the second external electrode, the third external electrode, and the fourth external electrode is defined by a plating layer only.

14. The three-terminal multilayer ceramic capacitor according to claim 13, wherein the plating layer includes a lower plating electrode and an upper plating electrode.

15. The three-terminal multilayer ceramic capacitor according to claim 13, wherein a thickness of the plating layer is greater than or equal to about 1 μm and less than or equal to about 15 μm.

16. The three-terminal multilayer ceramic capacitor according to claim 1, wherein a length dimension of the multilayer body is greater than or equal to about 1.0 mm and less than or equal to about 3.2 mm, a width dimension of the multilayer body is greater than or equal to about 0.5 mm and less than or equal to about 2.5 mm, and a thickness dimension of the multilayer body is greater than or equal to about 0.3 mm and less than or equal to about 2.5 mm.

17. The three-terminal multilayer ceramic capacitor according to claim 1, wherein
the first organic layer covers only the first base electrode layer;
the second organic layer covers only the second base electrode layer;
the third organic layer covers only the third base electrode layer; and
the fourth organic layer covers only the fourth base electrode layer.

18. The three-terminal multilayer ceramic capacitor according to claim 1, wherein
the first plating layer covers an entirety of the first organic layer;
the second plating layer covers an entirety of the second organic layer;
the third plating layer covers an entirety of the third organic layer; and
the fourth plating layer covers an entirety of the fourth organic layer.

19. The three-terminal multilayer ceramic capacitor according to claim 1, wherein
the first, second, third, and fourth organic layers cover an entire surface of the multilayer body between the first and third base electrode layers, between the first and fourth base electrode layers, between the second and third base electrode layers, and between the second and third base electrode layers.

* * * * *